(12) United States Patent
Dunn

(10) Patent No.: US 10,029,178 B1
(45) Date of Patent: Jul. 24, 2018

(54) COMPUTER-IMPLEMENTED METHOD FOR FACILITATING THE EXCHANGE OF INFORMATION BETWEEN INDIVIDUALS

(71) Applicant: Theodore M. Dunn, Boynton Beach, FL (US)

(72) Inventor: Theodore M. Dunn, Boynton Beach, FL (US)

( * ) Notice: Subject to any disclaimer, the term of this patent is extended or adjusted under 35 U.S.C. 154(b) by 0 days.

(21) Appl. No.: 15/284,226

(22) Filed: Oct. 3, 2016

Related U.S. Application Data

(63) Continuation-in-part of application No. 14/160,834, filed on Jan. 22, 2014, now abandoned.

(Continued)

(51) Int. Cl.
*G09B 19/22* (2006.01)
*G07F 17/32* (2006.01)
(Continued)

(52) U.S. Cl.
CPC .......... *A63F 13/335* (2014.09); *A63F 13/355* (2014.09); *G07F 17/3293* (2013.01); *G09B 19/22* (2013.01)

(58) Field of Classification Search
CPC ............................ G07B 19/22; G07F 17/3293
See application file for complete search history.

(56) References Cited

U.S. PATENT DOCUMENTS 1,866,133 A * 7/1932 Simon ...................... G06G 1/04
235/69
3,731,399 A * 5/1973 Gordy .................... G09B 19/22
273/149 P (Continued)

OTHER PUBLICATIONS

"OKBridge: The Experts' Choice for Online Bridge", accessed Jul. 16, 2006 via http://web.archive.org/web/20060716122039/http://www.okbridge.com/new-signup/deployed/index.php.*

(Continued)

*Primary Examiner* — Steven J Hylinski
(74) *Attorney, Agent, or Firm* — Glen E. Gold, P.A.; Glenn E. Gold; David Colls

(57) ABSTRACT

A computer-implemented system and method for facilitating the exchange of information amongst two or more individuals is provided, which can be effectively implemented into a myriad of applications. By way of example, in some applications (e.g., Contract Bridge card games) the method may be employed to increasingly improve the ability of card game playing partners to more accurately assess, and therefore more accurately predict, each other's strategies and moves in a card game scenario, wherein the sheer quantity of available card game moves results in the possibility of making such improvements via conventional means—such as practice games incorporating various different moves, verbal strategy-based discussions and the like—a statistical impossibility. In yet other applications (e.g., teaching in academic-type settings) the system and method incorporates an Internet website wherein teachers are able to utilize a host of website functions to efficiently analyze, via data feedback, the overall effectiveness of specific lessons, as well as a detailed analysis of individual student performance. In this manner, the method provides a unique means for teachers to continuously improve the overall effectiveness of their homework, lessons and exams, while also having an effective means for tailoring student-specific homework, lessons and exams, based upon what is most effective to optimize a particular student's learning.

5 Claims, 30 Drawing Sheets

Related U.S. Application Data

(60) Provisional application No. 61/755,357, filed on Jan. 22, 2013.

(51) Int. Cl.
*A63F 13/335* (2014.01)
*A63F 13/355* (2014.01)

(56) References Cited

U.S. PATENT DOCUMENTS

| | | | | |
|---|---|---|---|---|
| 3,899,837 A * | 8/1975 | Harnett | ............ | G09B 19/22 273/148 R |
| 4,009,522 A * | 3/1977 | Borianne | ............ | G09B 19/22 434/129 |
| 4,074,442 A * | 2/1978 | Landry | ............ | G09B 19/22 273/148 R |
| 4,159,581 A * | 7/1979 | Lichtenberg | ............ | G09B 19/22 273/149 P |
| 4,321,045 A * | 3/1982 | Crowley | ............ | A63F 1/06 273/148 A |
| 4,436,324 A * | 3/1984 | Barton | ............ | G09B 19/22 273/285 |
| 4,822,282 A * | 4/1989 | Weinstein | ............ | G09B 19/22 434/129 |
| 5,200,890 A * | 4/1993 | Pionchon | ............ | G09B 19/22 273/148 R |
| 5,397,133 A * | 3/1995 | Penzias | ............ | A63F 1/18 273/148 R |
| 5,743,797 A * | 4/1998 | Jannersten | ............ | A63F 1/18 463/11 |
| 5,768,382 A * | 6/1998 | Schneier | ............ | A63F 13/12 380/251 |
| 5,970,143 A * | 10/1999 | Schneier | ............ | A63F 13/71 380/251 |
| 8,088,006 B2 * | 1/2012 | Neff | ............ | A63F 1/18 273/148 B |
| 2001/0031657 A1 * | 10/2001 | White | ............ | A63F 1/18 463/11 |
| 2003/0177347 A1 * | 9/2003 | Schneier | ............ | A63F 13/12 713/151 |
| 2008/0118897 A1 * | 5/2008 | Perales | ............ | G09B 19/22 434/129 |

OTHER PUBLICATIONS

"Computers and Bridge", source http://www.bridgeguys.com/sec/computer_bridge_online.html, accessed May 14, 2015.*

"Bridge Club Live", accessed Sep. 28, 2011 via http://web.archive.org/web/20110928083606/http://www.bridgeclublive.com/A/Users%20Guide/Chat/bridge-site.asp.*

"Reviewing the Hand", sourced from http://okbridge.com/webhelp/GamePlay/Game_Reviewing.html. Published Dec. 8, 2004.*

* cited by examiner

FIG. 7

C2. RHO Opened the Bidding, After Partner Dealt and Passed.

For each bid by Partner: Enter your first response in the column
that represents your estimate of the playing strength of your hand.

| 1 You | ♠ Ax | ♥ KJ9xx | ♦ xxx | ♣ KJx |
|---|---|---|---|---|
| | HCP 12 | QT 2.0 | | 5332 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 2 You | ♠ QJx | ♥ Qx | ♦ 9xxx | ♣ Axxx |
|---|---|---|---|---|
| | HCP 9 | QT 1.0 | S | 4432 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 3 You | ♠ Kxxxx | ♥ T | ♦ AKQx | ♣ QTx |
|---|---|---|---|---|
| | HCP 14 | QT 2.5 | | 5431 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 4 You | ♠ T9x | ♥ Axxxx | ♦ JT | ♣ 9xx |
|---|---|---|---|---|
| | HCP 5 | QT 1.0 | S | 5332 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 5 You | ♠ Qxxxx | ♥ 9 | ♦ Qxx | ♣ KTxx |
|---|---|---|---|---|
| | HCP 7 | QT 0.5 | | 5431 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 6 You | ♠ K9 | ♥ KQxxx | ♦ AJx | ♣ Qxx |
|---|---|---|---|---|
| | HCP 15 | QT 2.5 | S | 5332 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 7 You | ♠ AJTx | ♥ Axxx | ♦ T9x | ♣ 9x |
|---|---|---|---|---|
| | HCP 9 | QT 2.0 | | 4432 |
| LHO | Pard | RHO | MIN | MID | MAX |
| P | 1C | | | | |
| P | 1D | | | | |
| P | 1H | | | | |
| P | 1S | | | | |
| P | 1N | | | | |

| 8 You | ♠ xx | ♥ JTx | ♦ Kxxx | ♣ AJxx |
|---|---|---|---|---|
| | HCP 9 | QT 1.5 | S | 4432 |
| LHO | Pard | RHO | MIN | MID | MAX |
| P | 1C | | | | |
| P | 1D | | | | |
| P | 1H | | | | |
| P | 1S | | | | |
| P | 1N | | | | |

```
                    Create Lesson Books

Public Lesson set
                      Your lesson books
                   Teddy's private lesson set
```

Lesson Books may be designated by their creator, as Public, Private, or Restricted.
    Public: Any user may access.
    Private: Any Contact of the Creator may access, or . . .
    Restricted: Only designated Contacts of the creator may access.

A user may create any number of Lesson Books.
    Teachers need separate Lesson Books for too many reasons to list here.
    All partnerships need a Lesson Book to record their agreements.
    Players may need separate Lesson Books for different partners.
    Any user may wish to publish his ideas for the general public.

Create a Lesson Book of your own.
    Select Lessons from the Menu Bar.
    Select Create a Lesson.
    Select an option: Public, Private, or Restricted
    Select the Contacts who may access a Restricted Lesson Book.
    Assign a name to your Lesson Book.
    Save your Lesson Book.

Update Your Lesson Books, as occasion requires.
    Select Lessons on the Menu Bar.
    Select your Lesson Book by name from the table of contents.
    Select add Lesson page(s).
    Select the *.pdf file you want to add to your Lesson Book.
    Delete any unwanted pages from your Lesson Books.
    Move pages to a more desirable positon.

Select a Lesson Book.
    Select *Lessons* on the Menu Bar.
    Select any Lesson Book from those you are authorized to access. (No others show.)

FIG. 20

| Advantages |
|---|

Drills
　　During play, you face a given situation sporadically, infrequently, and unpredictably. During a duplicate bridge session, your RHO opens six times, on average. Using the Drill for *RHO Opened*, you can bid from 10 to 30 cases in one hour. The more you practice a bidding skill in a given time period, the faster you will master the situation.

Everyone agrees, *Repetition is the Mother of Learning*.

Lesson Books
　　Every partnership suffers misunderstandings. Expert partnerships keep a written record of their methods and agreements. As your misunderstandings occur, you can build a Lesson Book of agreements, page by page. You can build a different Lesson Book for each partner. Teachers may create lesson books for each subject they teach.

A Lesson Book of previous agreements is a good way to settle current disagreements.

Additional Benefits for Teachers

Teach Over the Internet.
　　Recruit and teach students no matter where they may live.
　　Gain new students who admired your teaching on cruises.
　　Use Drills to teach students how to execute what they have learned in class.
　　Assign Drills to specific students for individual needs.

Improve your results using objective measures of performance.
　　When most students fail a Drill, improve the lesson.
　　When most students misunderstand specific points, repeat the Drill with new hands.
　　For failing students, Drill scores suggest remedial lessons, at an extra fee per lesson.
　　For students who demonstrate readiness, you can promote based on results.
　　Using Drill scores, instead of your personal opinion, avoids a lot of hurt feelings.
　　Drills can also be used to conduct a seminar, where the students discuss their ideas.

Start a new kind of practice, *Partnership Conflict Resolution.*
　　Some partners argue, even in public, without coming to agreement.
　　Some partners just exchange opinions, without giving their partners a reason to agree.
　　Invite such pairs to a series of counseling sessions.
　　Give each partner the same drill to answer and match.
　　Your purpose is not to adjudicate differences, but to teach how to come to agreement.
　　This practice can be done over the internet, as well as face to face.
　　This practice can be done with a single partnership, or sets of partners in a group setting.

From time to time, instead of lecturing, run a seminar.
　　Give the class a Drill related to the current subject matter. Discussion will help students to see how others think and decide to bid, and make it easier to recall what they learn.

FIG. 22

Put Your Drills to Work

A Drill consists of a number of cases related to a selected bidding situation. Each four cases come from a random shuffle and deal, displaying realistic hand distributions. Drills tell teacher and student, or two partners, how their bidding is the same, or not. The correct answers are what the partners have agreed to, or what the teacher says.

You may run any drill with new hands over and over, until the differences between you and your teacher, or you and your partner, are reduced to a tolerable minimum.

Every Drill will have some of the following action links:

| | |
|---|---|
| KEEP | Include the selected Drill in your Private Store of Drills. |
| DEAL | Re-shuffle and re-deal all hands in the Drill. |
| DEAL EW | Reshuffle and re-deal only the EW hands. |
| SAVE | Save the Drill in your Private Store of Drills. |
| SAVE AS | Save the Drill using a different ID. |
| ERASE | Erase all answers in the Drill. |
| CHANGE | Change the Situation without changing the hands. |
| ASSIGN | After answering a Drill, assign it to a contact, to enter answers. |
| MATCH | Match your answers with the Assigner's answers. |
| SHARE | Share an already matched Drill to any of your contacts for review. |
| PRINT | Print the Drill. |

FIG. 23

Make Your First Bid after the Bidding is Opened

Using this format, you can *Change* the Situation without changing the hands.
Select Change. Notice that although the Situation changes, the hands remain the same.
By this means you can see how the meaning and uses of a hand change with the situation.

Notice the hands in this situation.

Partner Opened One in a Suit, RHO Passed

Notice that the hands are the same, but that the situation has changed.

Partner Opened, RHO Doubled.

Show the same hands in any number of other situations that use this format.

Assign a Drill

Drills are designed to be answered separately by a teacher and student, or by two partners.

To assign a Drill
    Select a Drill from your Saved Drills.
    DEAL a fresh set of random hands, if you wish.
    Enter your answers in all the cases.
    ERASE as needed.
    SAVE as needed.

ASSIGN the Drill you answered to one or more of your Contacts.

Teddy, to send Drill BPD-1 to your Contacts, check the Select box for each recipient.

| Date | Contact | Select |
|------|---------|--------|
| 5/21/16 | Skoltyno | |
| 7/26/16 | Sappy | |

Select the check box for the Contacts you want to receive this Drill.
Select the *Done* link at the bottom of the Contacts list.
This copy of the Drill will be transferred to Drills in Play, for both Assigner and Receiver.

COMPUTER-IMPLEMENTED METHOD FOR FACILITATING THE EXCHANGE OF INFORMATION BETWEEN INDIVIDUALS

CROSS-REFERENCE TO RELATED APPLICATIONS

This U.S. utility patent application is a continuation-in-part (CIP) of, and claims priority to, co-pending U.S. non-provisional patent application Ser. No. 14/160,834, having a filing date of Jan. 22, 2014, which, in turn, claims the benefit of U.S. provisional patent application No. 61/755,357, having a filing date of Jan. 22, 2013, all of which have been filed in the name of the same applicant. The entire contents of both the aforementioned previously-filed U.S. provisional and U.S. non-provisional utility patent applications are incorporated-by-reference herein.

FIELD OF THE INVENTION

The present disclosure generally relates to a computer-implemented system and corresponding methods for enabling and facilitating the exchange of information between two or more individuals, which can be effectively implemented into a myriad of applications. By way of example, in some applications (e.g., Contract Bridge card games) the method may be employed to increasingly improve the ability of card game playing partners to more accurately assess, and therefore more accurately predict, each other's strategies and moves in a card game scenario, wherein the sheer quantity of available card game moves results in the possibility of making such improvements via conventional means—such as practice games incorporating various different moves, verbal strategy-based discussions and the like—a statistical impossibility. The flexibility of the present invention makes it easily adaptable for implementation into a wide variety of applications. For instance, in addition to the aforementioned Contract Bridge card playing game scenario, the system and methods of the present invention are perfectly adaptable for implementation into educational-based applications within an academic environment, in a manner benefitting both teachers and students. In particular, as described in further detail below, one exemplary implementation enables teachers to promptly access a vast array of useful data (e.g., informational data associated with homework assignments, quizzes, exams, etc.) enabling the teacher to gauge the effectiveness of general and specific teaching techniques, the effectiveness of particular lessons and the like, while further using the data to simultaneously tailor teaching lessons and methodologies to suit individual student needs.

BACKGROUND OF THE INVENTION

There are a wide range of scenarios, including, for example, entertainment-related card game settings and education-related learning environments, wherein great benefits would be derived given the capability of individuals to exchange application-specific types of information between respective individual-controlled computers, portable electronic devices and the like, in a discreet manner incorporating useful functional features, with the ultimate goal of affecting an increased understanding by one individual of the mental thought processes of at least one other individual. An example of one such scenario pertains to the playing of a well-known popular card game commonly referred to as "Contract Bridge."

It cannot be overemphasized that the Applicant's reference to the card game "Contact Bridge" throughout this patent application is merely the result of Applicant's choice to use this particular card game to illustrate one example clearly conveying the beneficial effects of the present invention as a means for facilitating the computer-implemented exchange of information between individuals—in this case between two individuals functioning as partners—in a competitive card game incorporating rules strictly limiting available means for partner-to-partner communication. Accordingly, the card game Contact Bridge merely represents one of a myriad of possible situations wherein the present invention effectively functions to create—otherwise unavailable—means for enabling individuals within the aforementioned possible situations to communicate with one another.

In the case of Contract Bridge, the system and method of the present invention happen to very effectively solve a well-known, long-standing, as-of-yet unresolved problem associated with card game playing partner-to-partner communications; namely, situations in which restricted, or limited, communication between individual playing partners has been clearly shown to negatively impact one or more goals (i.e., of the aforementioned card playing partners) associated with the particular scenario. Accordingly, as will be clearly apparent to those skilled in the art, although Contact Bridge provides a convenient example to illustrate the benefits of the broader overriding concept—used herein to explain one example of how the present invention can be implemented to solve a long-standing problem—the present invention should in no way be considered limited to this, or any other, implementation of the present invention referenced herein. To the contrary, the present invention already has widespread applicability, and will likely prove to be very effective as a learning tool that will continue to be adapted for use with a growing number of applications.

In order to understand the problem that this invention has solved with respect to the game of Contract Bridge, it is not necessary to have expert-level knowledge of the game. However, understanding at least the basics of Contract Bridge will likely prove beneficial—providing a greater understanding of the present invention's effectiveness overcoming the long-standing problems, drawbacks and limitations associated with Contract Bridge that the invention solves. Although some very basic principles of the game will be described herein, it is recommended that the reader peruse the Internet (or local bookstore) for one of many available websites (and/or books) that provide a very thorough and detailed explanation of the finer points of the game. As an example, the web site www.BridgeWorld.com appears to provide a relatively comprehensive description of the more significant features of the game. Applicant hereby incorporates the entire contents of this website herein by reference thereto.

In its most basic form, Contract Bridge is a card game of skill, which is conventionally played by four people divided up into two 2-man teams of competing partnerships. For purposes of scoring and reference, each player is identified by one of the points of the compass, wherein North and South (Team 1) play against East and West (Team 2). Variants of this framework can be used incorporating additional players, but the most popular and common play is with a four-person field of players. The game normally utilizes a conventional 52-card playing deck (or, alternatively, two decks are sometimes used, for convenience). The four suits are ranked as follows: Spades (highest rank); Hearts (second highest rank); Diamonds (third highest rank);

and Clubs (lowest rank). Each suit contains thirteen cards, from Ace (highest) to deuce (lowest). The five most powerful cards in each suit (i.e., Ace through Ten) are commonly referred to as "Honor" cards, while the lower nine cards (i.e., Nine through Deuce) are commonly referred to as "Spot" cards. The rank of the cards within a suit applies to the phase of Bridge called "the play."

Unlike some activities in which every participating individual is out for himself or herself, Contract Bridge is a partnership trick-taking card game in which on each of several successive deals the opposing sides may initially compete in a bidding auction for the right to establish the contract for that deal, with the side winning the auction commonly referred to as the "declaring side."

The contract is an exchange of the right to establish which suit, if any, is trumped for an undertaking to win, as a minimum, the number of tricks specified by the highest bid. After the contract has been established, the play of the cards proceeds as in most trick-taking card games until all thirteen tricks have been played. At any time during the play, one side may claim a stated number of the remaining tricks and concede the balance, if any.

Based on the actual number of tricks taken, the declaring side will have either succeeded or failed in fulfilling the contract. If successful, also known as "making" or to have "made," the declaring side scores points. If unsuccessful, also known as going "down" or being "defeated," the defending side scores points. The overriding objective is to win the contest by accumulating more points than the opponents. Although each variant of Contract Bridge has its own particular scheme for awarding and accumulating points, all are based upon whether or not the contract for each deal was made or defeated, and by how many tricks.

The bidding process comprises one of the more involved strategic stages of the card game. For example, bidding a contract that one does not expect to make and doe expect to be defeated, thus losing some points, can sometimes be advantageous rather than allowing the opposing side to bid and make a contract, which would score them an even greater number of points. This is known as a "sacrifice," and is not uncommon if both sides are contesting the final contract. Thus, much of the complexity in bridge arises from the difficulty of arriving at a good final contract in the auction. This is a difficult problem because the two players in a partnership must try to communicate sufficient information about their hands to arrive at a makeable contract, but the information they can exchange is restricted to information that may be passed only by the calls made and later by the cards played, not by other means. Additionally, the agreed-upon meaning of each call and play must be available to the opponents.

Because a partnership that has the freedom to bid gradually at leisure can exchange more information, and because a partnership that can interfere with the opponents' bidding (as by raising the bidding level rapidly) can cause difficulties for their opponents, bidding systems are both informational and strategic. It is this mixture of information exchange and evaluation, deduction and tactics, which is at the heart of bidding in bridge. Significantly, in this game exact situations are virtually never duplicated, since there are apparently 53,644,737,765,488,792,839,237,440,000 possible situations (deals). Accordingly, every situation will offer something unique. Certain general principles are useful in many different situations, and their mastery is rewarding to serious students of the game. However, due to the astronomical number of possible situations, conventional tactics that may be useful in other card games (e.g., partners playing a great quantity of practice hands and discussing strategies to employ depending upon a particular situation) are wholly ineffective. Accordingly, it is not uncommon for partners to end up arguing soon after commencing a discussion as to what went wrong that resulted in a loss, why certain actions were taken by one's partner, etc.

Once the contract bid has been established, the cards are then played to determine who takes which tricks. Playing techniques for taking tricks also involves strategy, wherein there are substantially four ways of taking a trick by force. Taking tricks by playing a high card that no one else can beat or by trumping an opponent's high card are the easiest ways to take a trick. Tricks can also be taken by establishing long suits wherein the last cards in a suit will take tricks if the opponents don't have the suit and are unable to trump, and by playing for the opponents' high cards to be in a particular position. Nearly all trick-taking techniques in bridge can be reduced to one of these four methods. Again, conventional means used by partners attempting to determine what mistakes were made and by whom often spiral into a completely non-productive argument.

The optimum play of the cards can require much thought and experience, and is also the subject of strategy and understanding between partners. This is a very critical issue. Contract Bridge presents a fascinating challenge in the area of communications. Each player holds thirteen cards, and there are clearly defined rules concerning the information a player is permitted to give to his or her partner. Within these highly-restrictive limitations, players must choose ways to exchange information in order to get the most out of the combined partnership assets. Due to the staggering statistically proven variations of situations, Contract Bridge is not a game wherein partners can learn to manage the game manually by human beings, nor gain a better understanding of a partner's style of play based upon practice games (neither in-person practice games nor long distance Internet practice games). For this reason, there has been a long-standing unmet need for a means of providing partners with a method to improve the mental aspects of the game. That is, it would be very beneficial to provide a computer-implemented system and method that could be employed by playing partners, which could effectively improve each partner's ability to expand his or her understanding of a partner's mental thought process based upon a given situation, where that understanding cannot be enhanced through memorization of previously played hands.

Contract Bridge has also become the subject of electronic access via various Internet applications and services. In this way, individuals are now offered online opportunities to play Contract Bridge or one of its variants without the need to assemble four people in one physical location. Utilizing an electronic device such as a personal computer, smart phone, tablet or other similar device to access the application and service permits an individual the ability to play the game on demand. The immediate access and electronic processing brings certain advantages to the game, such as easy analysis of games played, the ability to play with partners geographically distant, faster play without the need to shift chairs or wait for shuffles of the card deck, a more stringent adherence to the rules, and eliminating the unauthorized passing of information by tone of voice or body language.

However, the aforementioned disadvantages remain, even with a system of the playing of Contract Bridge utilizing electronic devices and between geographically remote players. Partners remain unfamiliar with each other and are thus unable to decide on bidding and playing conventions ahead of the game and thus remain at a disadvantage in coordinating their combined play. In a more general sense, what is needed is a computer-implemented system and method for improving the facilitation of information exchange between individuals (e.g., Contract Bridge partners, Teachers and students, etc.) which would function to benefit all involved individuals.

Accordingly, it would be highly desirable to provide such a system and method, whereby individuals in computer (or other electronic device) communication, albeit geographically remote from one another, can establish scenarios and exercises enabling them to facilitate the efficient exchange of information that overcome impediments associated with particular scenarios associated with existing computer-implemented information exchange. It would be further desirable to provide such a system having adequate flexibility to he adapted for use by teachers of a particular subject matter (i.e., not just Contact Bridge teachers, but, for example, teachers within an educational school system trying to maximize their students' learning of particular subjects) to more effectively and efficiently exchange information with students while also improving the learning of such information by students.

SUMMARY OF THE INVENTION

The present disclosure is generally directed to a computer-implemented method for improving the exchange of information between individuals. In one general implementation of the invention, a method is provided for enabling a pair of individuals (e.g., Contract Bridge players) to improve a playing strategy where the utilization of conventional strategy improvement means, such as, for example, playing practice card hands (e.g., in the Contract Bridge example) is not an option—in the case of Contract Bridge, due to the lack of any repetitiveness of card playing hands. In a second general implementation of the invention, a method is provided for improving the exchange of information between one or more teachers and one or more corresponding students of the teachers. In this implementation, the method is employed in a manner geared more toward optimizing the teaching effectiveness associated with teachers in academia attempting to enable and facilitate student learning of educational subjects typically associated with an educational, academic, or similar type learning environment.

With regard to a first exemplary implementation of the present invention, a computer-implemented method is provided for improving the exchange of information between individuals playing together as an independent Contract Bridge partner team, the disclosure is generally directed to a method of creating and sharing exercises and lessons relating to an event between individuals for the purpose of improving mental strategizing and teaching the game of Contract Bridge. The method includes providing an executable instruction set for creating Contract Bridge exercises hosted on a system of the type wherein the central office of a host Contract Bridge service company has a central computer and memory storage communicative with an electronic network, a first network terminal accessible by the North player and a second network terminal accessible by the South player. A Contract Bridge game exercise simulating the dealing of cards for a game of bridge is created utilizing the first network terminal and hosted by the central computer. At least one South player is invited to view the created exercise and submit a practice bid, and a practice bid for the created exercise is submitted by the North player. The bids of the North and South player are compared, and a communication exchange is facilitated between the North and South players with respect to the bidding strategy of the exercise utilizing the system of the central office and the first and second network terminals. The exercise is stored in an account established for the North player.

In an aspect of this exemplary implementation of the present invention, a device is provided for improving the way that the game is taught, which is also adaptable for improving the teaching of other methodologies. The system may employ a variety of website interface architectures. For instance, while not a preferred implementation, the website may incorporate a so-called "Host-Guest" style architecture. Alternatively, in a more-preferred implementation the website may be designed having a format geared around the offering of two services—Drills and Lessons. The following paragraphs include a first series of paragraphs that describe aspects associated with the former (i.e., Host-Guest) style architecture, followed by a second series of paragraphs that describe aspects associated with the latter (i.e., Drills and Lessons) style architecture.

In an aspect particularly associated with the Host-Guest style architecture, all activities may take place between two users: a Host and a Guest of the Host. Optionally, a Host may have an unlimited number of Guests, a user may be a Guest of any number of Hosts and may be a Host to other Guests, two users may function as each other's Host and Guest, and all interactions between a Host and a Guest is preferably asynchronous.

In another aspect, in light of the fact that Bridge players, in the course of play, face a number of commonly occurring situations, one or more Lessons may be provided, wherein each Lesson is defined by a set of cases of the same situation, each with its own randomly dealt hand. That is, there are not any prepared hands designed to illustrate a particular point. Instead, all hands are randomly dealt in order to conform to reality during actual play.

In another aspect, a Host may perform the following functions: (1) inviting Guests; (2) Selecting previously created built in Lessons; (3) creating original Lessons; (4) responding to, or answering, Lessons; (5) electronically communicating one or more answered Lessons to one or more Guests of the Host; and (6) exchange messages with one or more Guests of the Host.

In another aspect, the principle actions, interactions, features and functions of the Host may include: (1) selecting or creating a Lesson type; (2) saving the Lesson type within a privately maintained collection of Host Lessons; (3) dealing hands, deleting/erasing answers and otherwise manipulating Lessons; (4) entering answers in selected Lessons; and electronically communicating Lessons to one or more Guests of the Host.

In another aspect, the principle actions, interactions, features and functions of the Guests may include: (1) receiving and saving Lessons sent by a Host of the Guest; (2) inability of the Guest to view the answers of a Host of the Guest; (3) entering the Guest's answer to Host Lessons; and (4) selecting a "match" option in order to view both the Guest's answer and the Host's answer.

In another aspect, a Host and a Guest of the Host are able to view all previously sent Lessons not yet matched in a their respective Lessons In Play collections, as well as all Matched Lessons previously saved in in their respective Matched Lessons collections.

In another aspect, a Host and one or more Guests of the Host may electronically communicate, or exchange, Messages at will.

In an aspect particularly associated with the Drills and Lessons style architecture, a significant feature is provided wherein any user can create a personal user Lesson Book, which the user may update continuously or periodically through the addition of newly-created user pages. Likewise, the user may further modify the Lesson Book contents through the removal or content modification of existing pages. The user Lesson Book can be designated as Public (i.e., made accessible to anyone having access to the website) or Private (i.e., only made accessible to users who have agreed to be contacts of each other). For instance, teachers may prefer to have their lessons on the Internet specifically for their students to access. Well-known, or famous, individuals in the Bridge world may prefer to have their own book publically accessible and associated with advertisements geared to produce found income for them, without requiring more work than uploading pages they have already written. In this case, preferably, all income from advertisements would be directed to the author, with the caveat that the author would be required to agree to state something favorable about the website (i.e., in order to provide some benefit to the website owner).

In another aspect particularly associated with the Drills and Lessons style architecture, a Sign Up page is provided, wherein Teachers need a book of lessons for each of the various methods they teach, Players need a record of agreements and understandings for each of their partners, and Competitors need Drills in order to practice, learn a skill faster, and achieve mastery sooner. Once an individual has formally signed up, they may access the website via a conventional Log In page.

In another aspect particularly associated with the Drills and Lessons style architecture, an Invite Contacts page may be provided, wherein a Contact is defined as a user, whom is invited by another user to be a Contact of the other user, and the invited user accepts the invitation. In this case, no matter who invited whom, each user is a Contact of the other. Preferably, there is no limit to the number of Contacts a user may invite, nor is there a limit on the number of Contact invitations a user may accept. Preferably, a user's list of Contacts is divided up into Pending and Active status Contacts. Pending users are deemed to be those individuals a user has invited, but who have not yet accepted. Active users are deemed to be those individuals for whom the process of invite-accept has been completed. Pending users who reject the invitation are removed from the list. The Contact list may be sorted by date, username or status.

In another aspect particularly associated with the Drills and Lessons style architecture, Lesson Books may be designated by their creator as Public (i.e., any user may access), Private (i.e., any Contact of the Creator may access) or Restricted (i.e., only designated Contacts of the creator may access). A user may create any number of Lesson Books. Typically, Teachers would need separate Lesson Books for a host of reasons. All partnerships require a Lesson Book in which to record their agreements. Players may require separate Lesson Books for respective different partners. Any user may desire to publish his ideas for the general public to access.

In another aspect particularly associated with the Drills and Lessons style architecture, the process for a user to create a Lesson Book of his own may be include the steps of: (1) Selecting "Lessons" from a Menu bar; (2) Selecting "Create a Lesson;" (3) Selecting an option from a list, including: Public; Private or Restricted (note: the user may then select one or more Contacts who may access a Restricted Lesson Book); and (4) Saving the Lesson Book.

In another aspect particularly associated with the Drills and Lessons style architecture, a user may elect to update a Lesson Book via the steps of: (1) Selection "Lessons" on the Menu bar; (2) Selecting the user's Lesson Book, e.g., by name, from a Table of Contents; (3) Selecting "Add Lesson Page(s);" (4) Optionally, selecting the file (e.g. *.pdf format file) the user desires to add to his existing Lesson Book; (5) Optionally, deleting any existing unwanted pages from a user's existing Lesson Book; and/or (6) Reorganizing the location of one or more pages (i.e., re-ordering the pages). In an optional implementation, Lesson Book files may be provided in a file format enabling a user to make modifications to a specific existing Lesson Book page.

In another aspect particularly associated with the Drills and Lessons style architecture, a user may Select a particular Lesson Book by: (1) Selecting "Lessons" on the Menu bar; and (2) Selecting any displayed Lesson Book from a subset of listed Lesson Books the user is authorized to access. Preferably, only Lesson Books that the user is authorized to access are displayed for selection.

In another aspect particularly associated with the Drills and Lessons style architecture, a Manage Drills page is provided to enable a user to: (1) Select a Standard Drill; (2) Create a New Drill; (3) Select to display a list of Saved Drills; (4) Select to display a list of Drills in Play; and (5) Select to display a list of Matched Drills.

In another aspect, the system and methods of the present invention enable teachers to continuously analyze the efficacy of different teaching approaches, as well as determine which students are improving and which students are not improving. In this manner, the Teacher can adjust his/her teaching approach on a case-by-case basis.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

Figure 7:
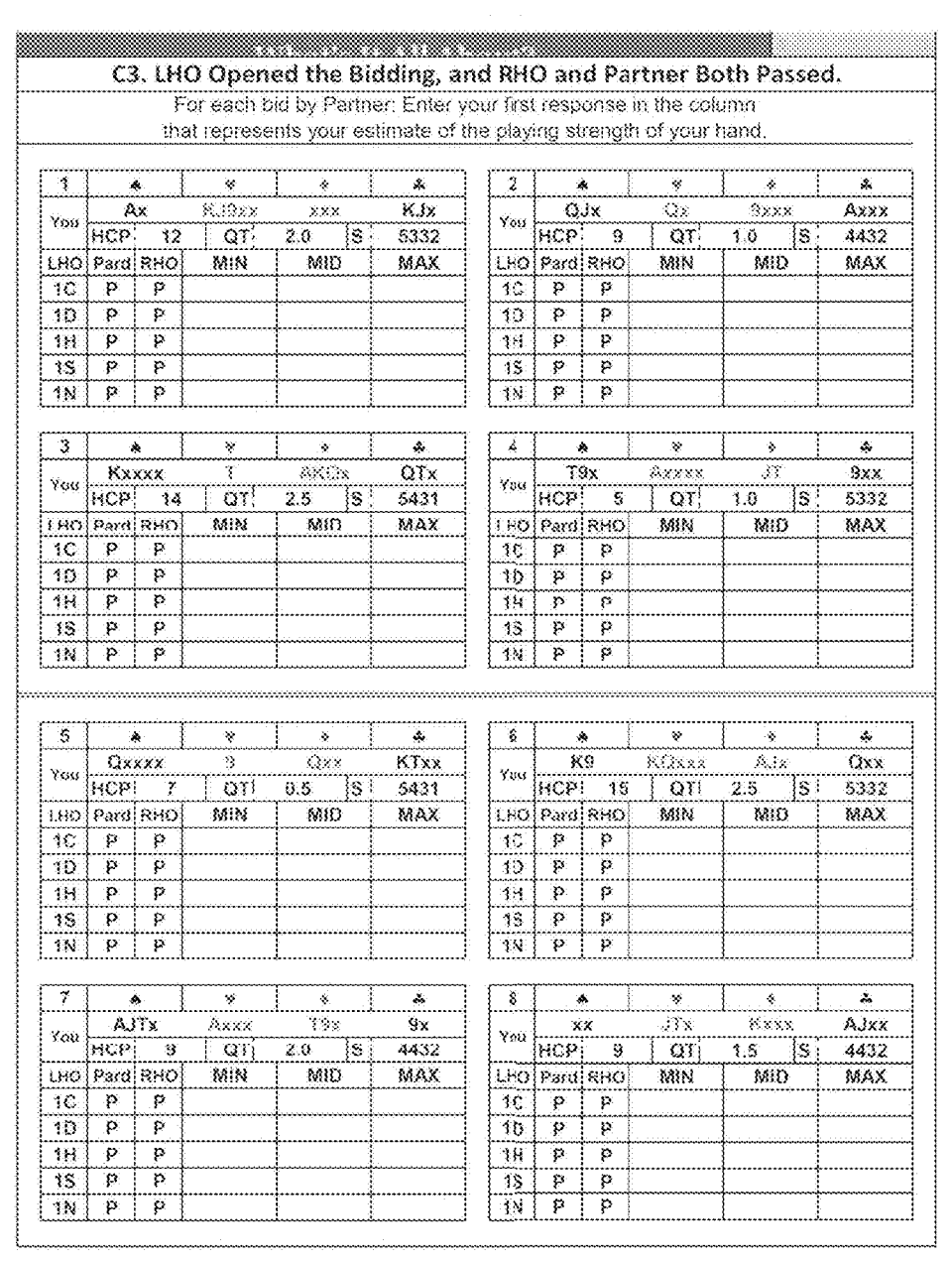

FIG. 7 presents a sample screenshot of an embodiment of the network based system for strategizing and conferencing originally introduced in FIG. 1;

FIG. 8 presents a sample screenshot of an embodiment of the network based system for strategizing and conferencing originally introduced in FIG. 1.

Figure 11:
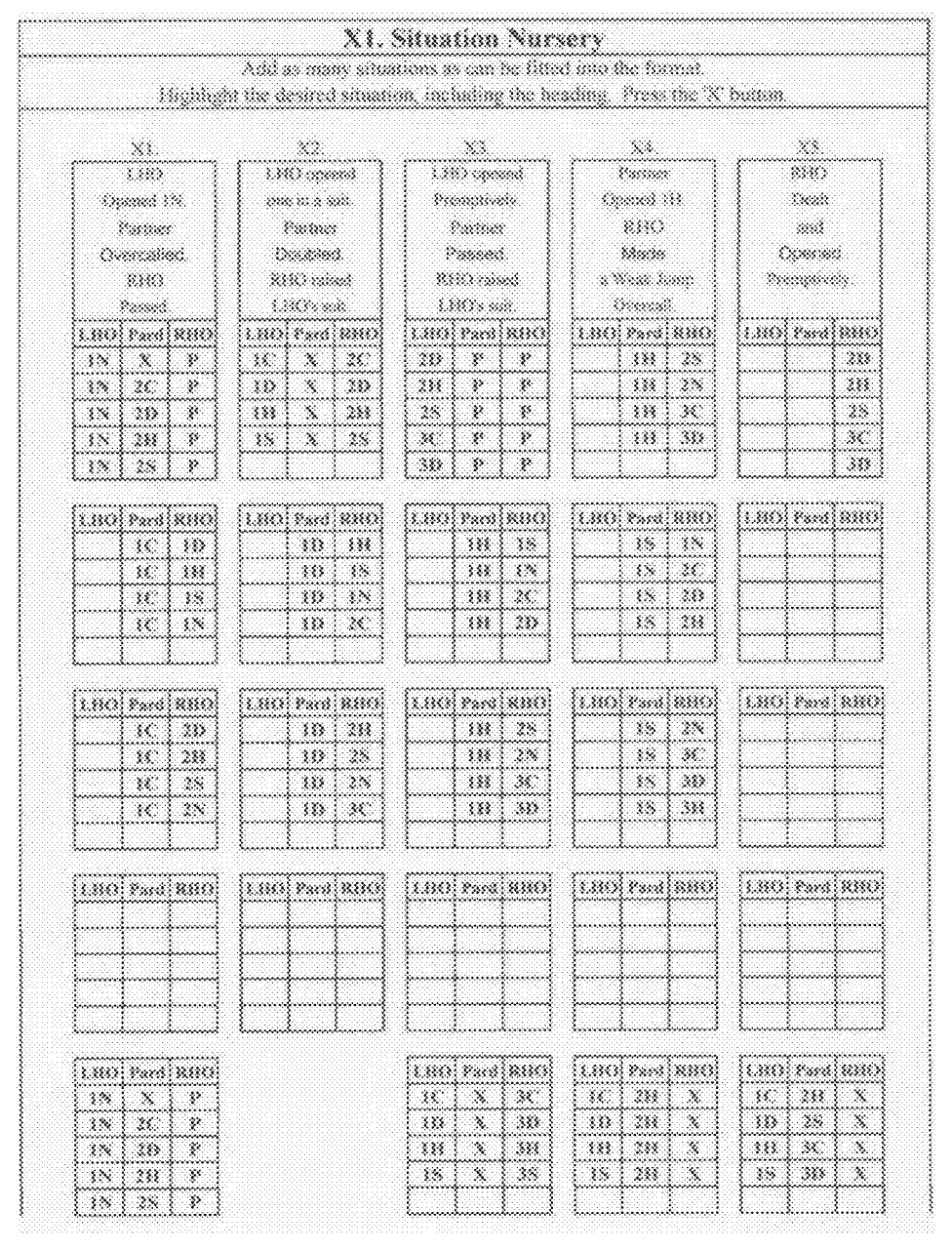

FIG. 11 presents a chart of a situation nursery of the network based system for strategizing and conferencing originally introduced in FIG. 1;

Figure 12:
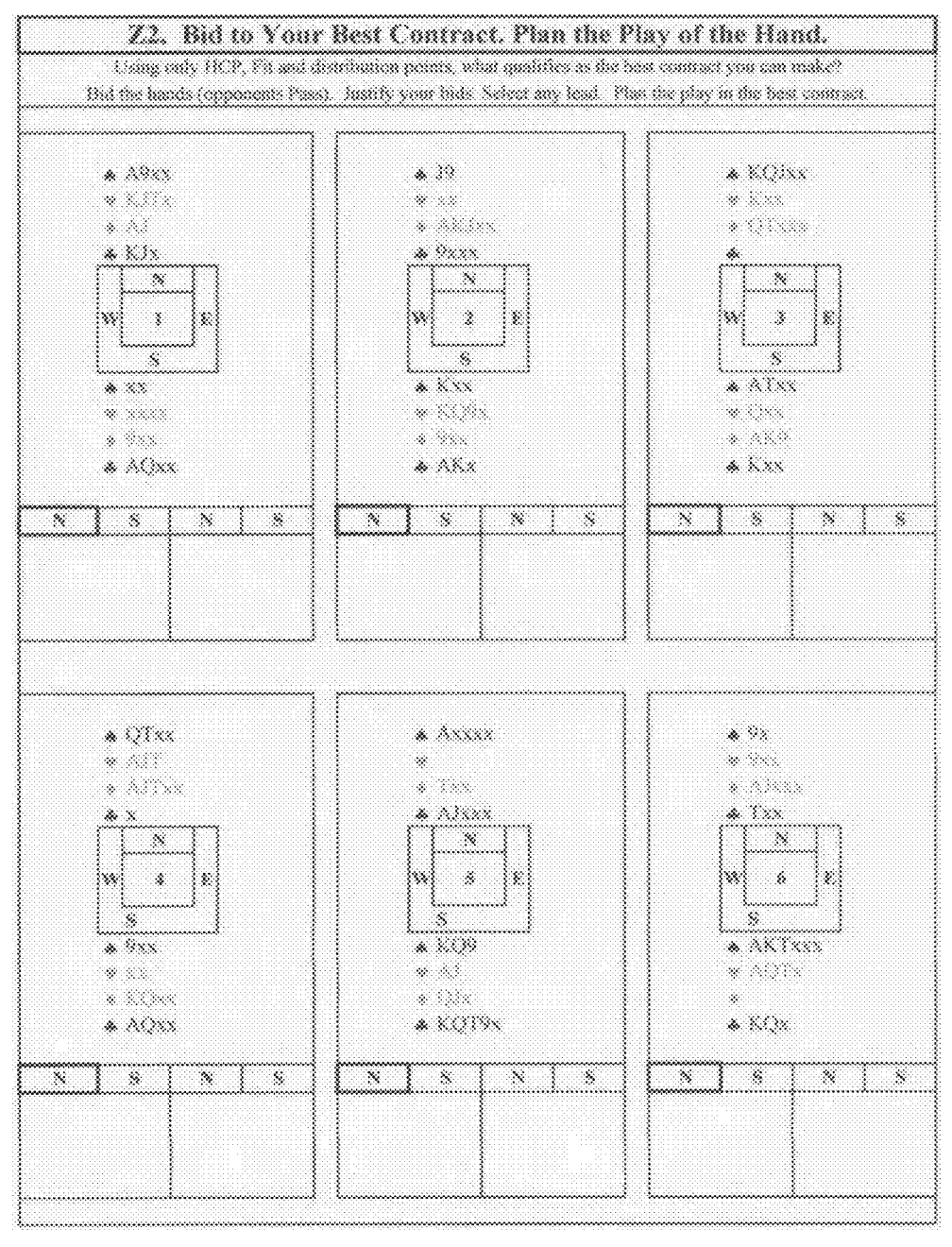

FIG. 12 presents a chart in accordance with an embodiment of the network based system for strategizing and conferencing originally introduced in FIG. 1;

Figure 15:
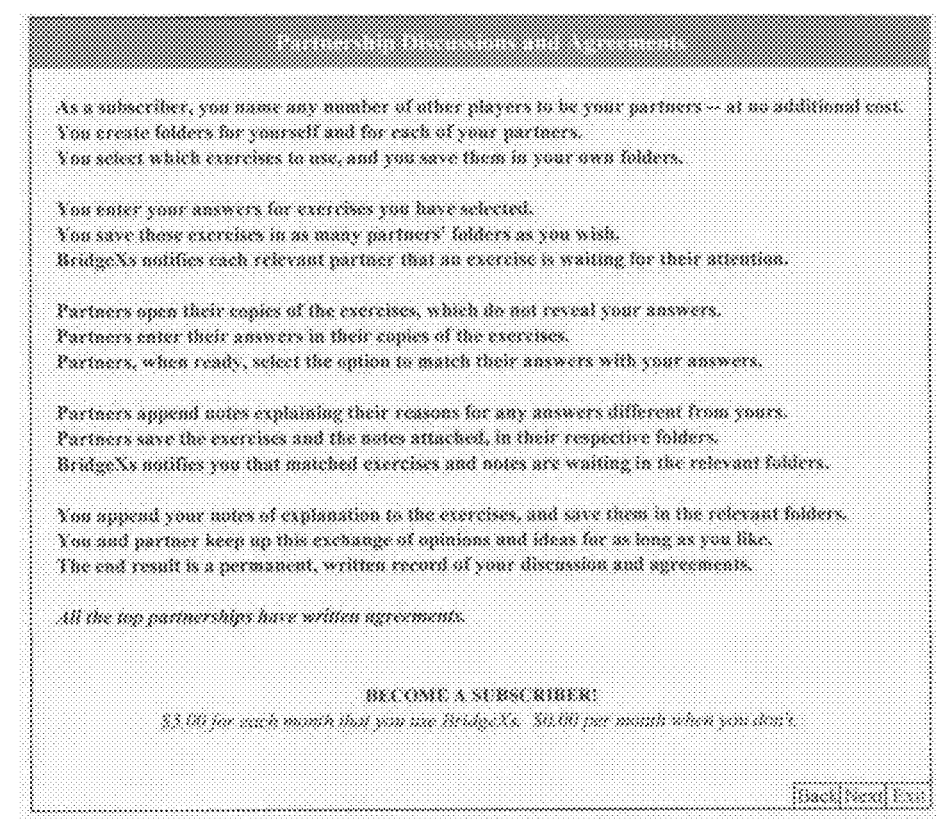

FIG. 15 presents a sample partnership and discussion agreement of an embodiment of the network based system for strategizing and conferencing originally introduced in FIG. 1;

FIG. 20 presents a sample screenshot pertaining to a Create Lesson Books page of an Internet web site, in accordance with an exemplary implementation of the invention;

FIG. 22 presents a sample screenshot pertaining to an Advantages page of an Internet website, in accordance with an exemplary implementation of the invention;

FIG. 23 presents a sample screenshot pertaining to a Put Your Drills to Work page of an Internet web site that describes the concept of creating and utilizing drills, including some examples of action links associated with an individual Drill, in accordance with an exemplary implementation of the invention;

FIG. 25 presents a sample screenshot pertaining to a Make Your First Bid After The Bidding is Opened page of an Internet web site, in accordance with an exemplary implementation of the invention;

Figure 26:
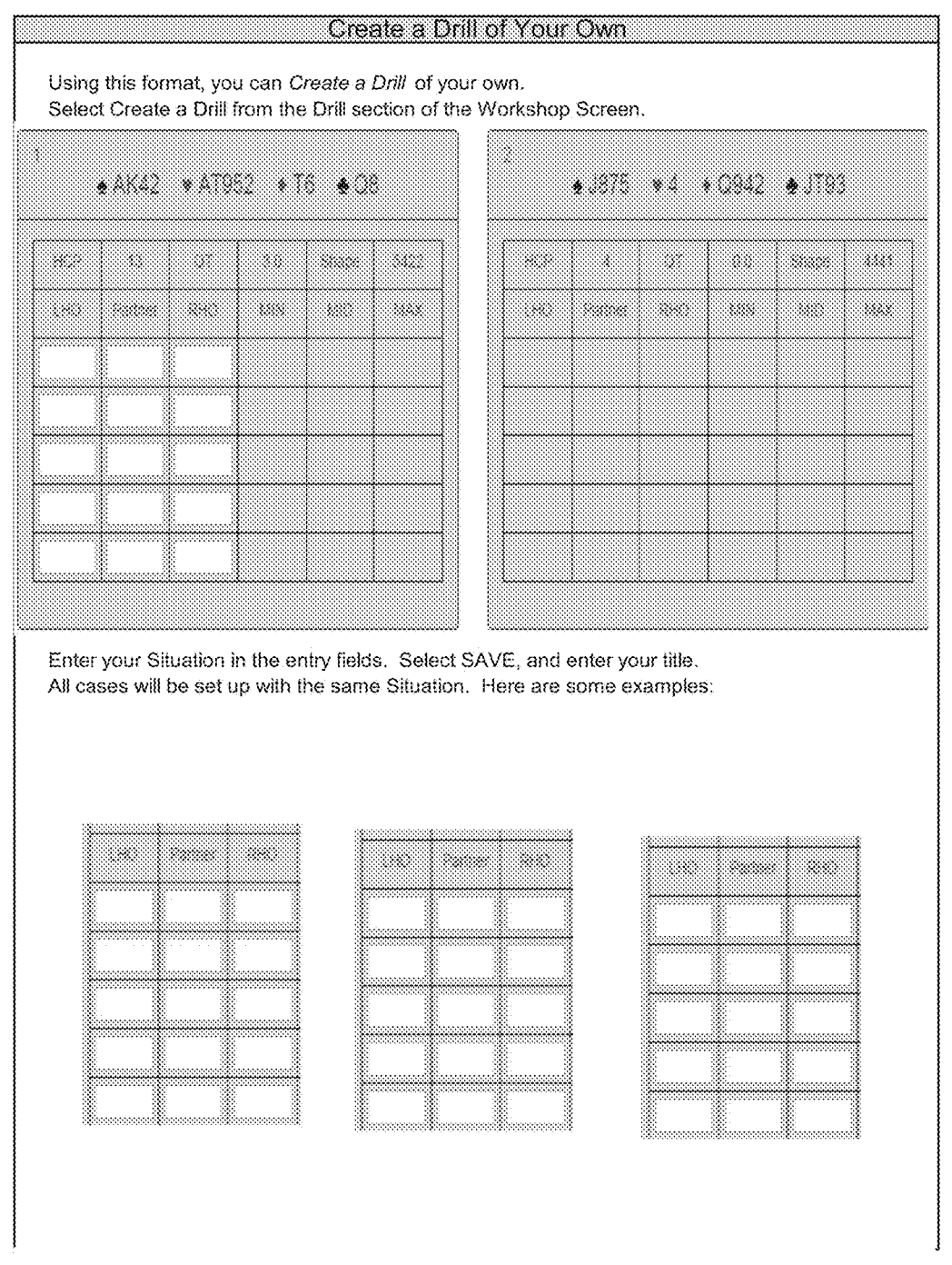

FIG. 26 presents a sample screenshot pertaining to a Create a Drill of Your Own page of an Internet web site, in accordance with an exemplary implementation of the invention;

FIG. 29 presents a sample screenshot pertaining to an Assign a Drill page of an Internet website, in accordance with an exemplary implementation of the invention; and FIG. 30 presents a sample screenshot pertaining to a Match a Drill page of an Internet website, in accordance with an exemplary implementation of the invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
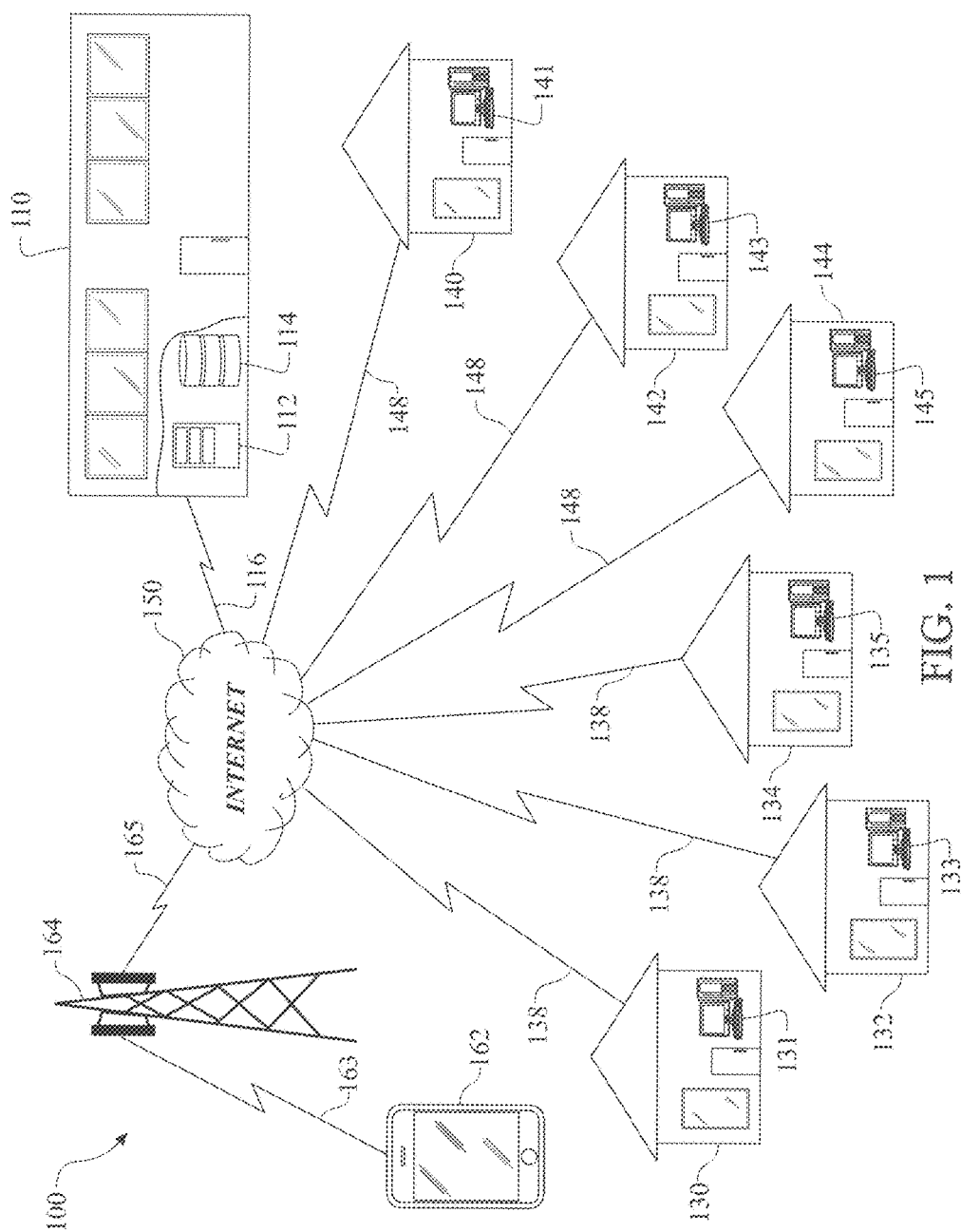
FIG. 1 presents a schematic depiction of a network-based system for strategizing and conferencing between geographically remote Contract Bridge partners.

In one exemplary implementation of the invention, a system 100 for creating Contract Bridge bidding and playing exercises for the purpose of strategizing and coordinating between potential partners, is shown in FIG. 1 and illustrates its various components. The Contract Bridge exercise system 100 is based at a central office 110 of a host service company. The host service company central office 110 houses a computer 112 executing an instruction set for creating Contract Bridge exercises and scenarios and is further interconnected with a searchable storage medium 114 for storing the exercises and member data associated therewith. The computer 112 is also connected to the Internet 150 with a communications link 116 for communicating with entities outside of the central office 110.

For purposes of ease of description herein, the bridge exercise examples are illustrated as a North-South (NS) partnership between a paying subscriber (North) (i.e., of an Internet web site for accessing and using the system of the present invention) and a potential partner (South), whom may or may not be a paying subscriber. However, these examples are exemplary only and are not limiting as to the types and extent of the Contract Bridge exercises and scenarios generated, nor limiting with respect to the scope of the system or methods described and depicted herein. A plurality of paying subscribers 130, 132, 134, here represented by home pictorials, subscribe to the Contract Bridge exercise services offered by the host service company. Each paying subscriber 130, 132, 134 has a network terminal 131, 133, 135, such as a personal computer, or any other electronic device enabling access to the system, that is further electronically linked to the Internet 150 via electronic communication links 138. In this manner, the paying subscriber 130, 132, 134 can communicate with the central office 110 of the host service company, utilizing the communication protocols of the Internet and the instruction set executed by the computer 112 at the central office 110. In like manner, the non-paying subscribers 140, 142, 144, here also represented by home pictorials, possess network terminals 141, 143, 145, such as a personal computer or other electronic device, which are communicative with the Internet 150 via the electronic communication links 148.

Alternatively, as previously mentioned, any of the paying and non-paying subscribers 130, 132, 134, 140, 142, 144 can also communicate via Internet 150 utilizing a portable personal electronic device 162 communicative via a link 163 of a dedicated communications network 164. The communications network 164 is further communicative with the Internet 150 via the communications link 165. Those practiced in the art will readily recognize that the personal electronic device 162 can be a smart phone, a personal digital assistant, an electronic tablet, or other similar device currently available or available in the future that exhibits electronic communications abilities such as text messaging, email, mobile Internet access or other communication protocols.

Figure 2:
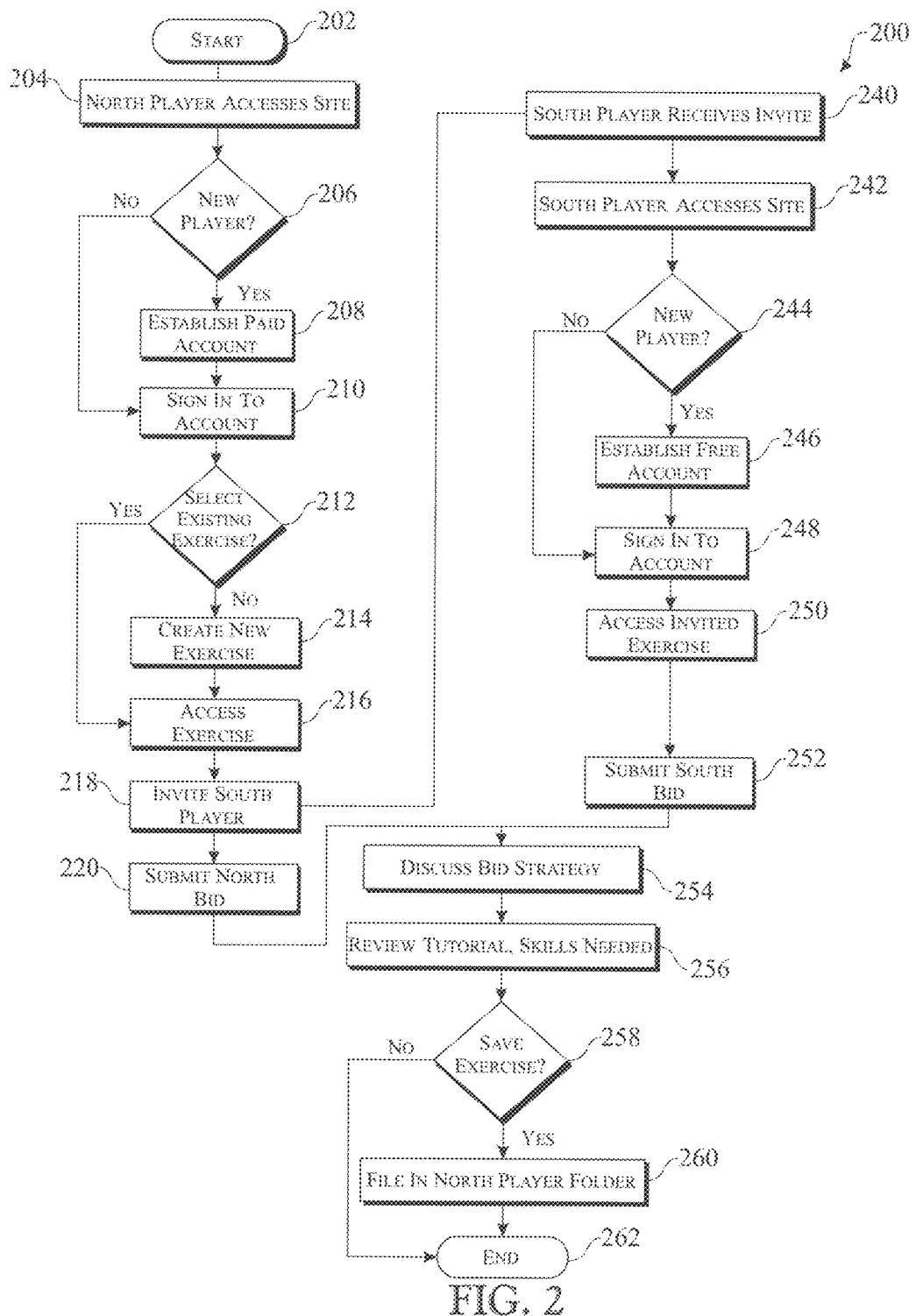
FIG. 2 presents a block diagram of a method for conducting strategy exercises between Contract Bridge bidding partners.
Figure 3:
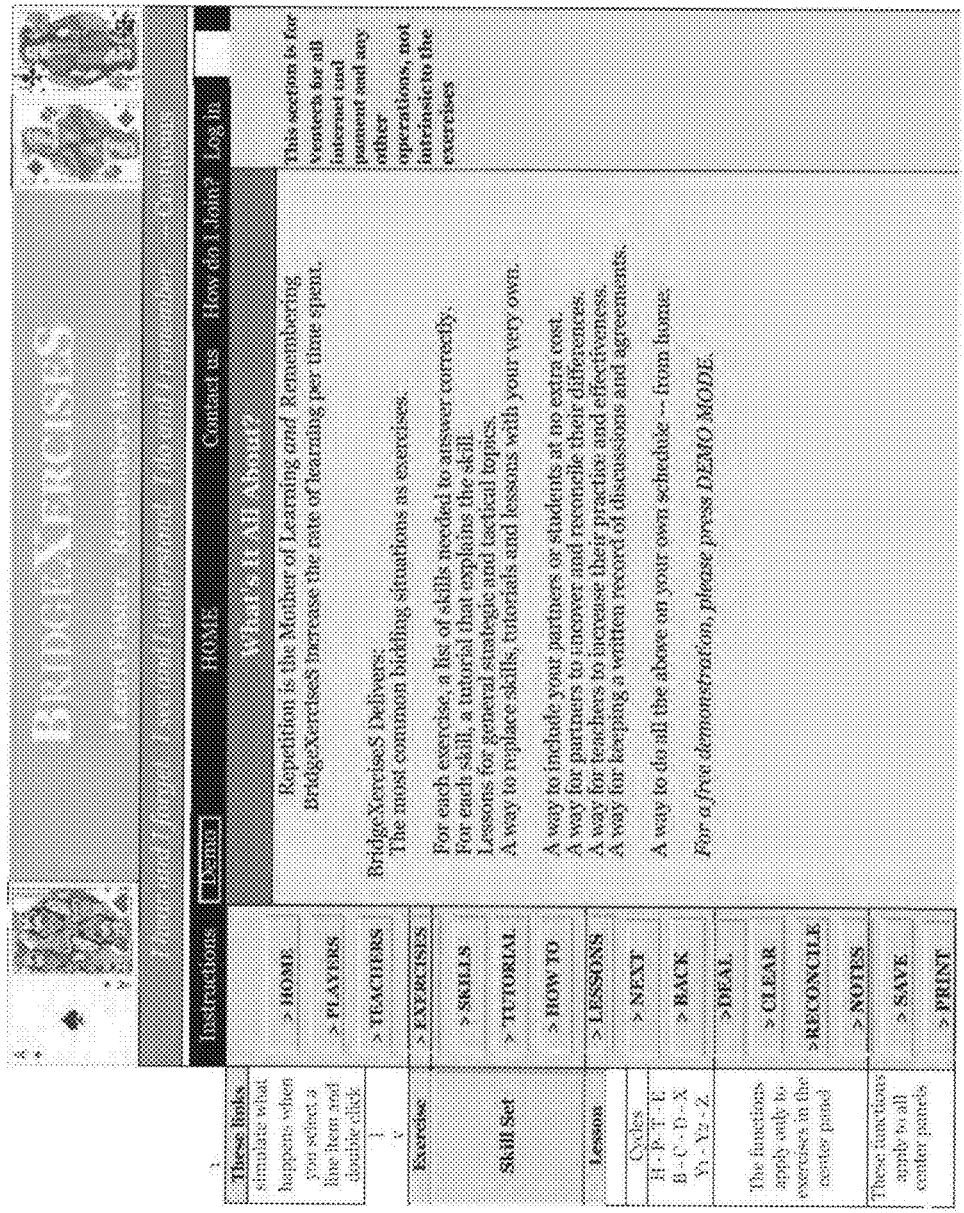
FIG. 3 presents a sample screenshot of an embodiment of the network based system for strategizing and conferencing originally introduced in FIG. 1.
Figure 4:
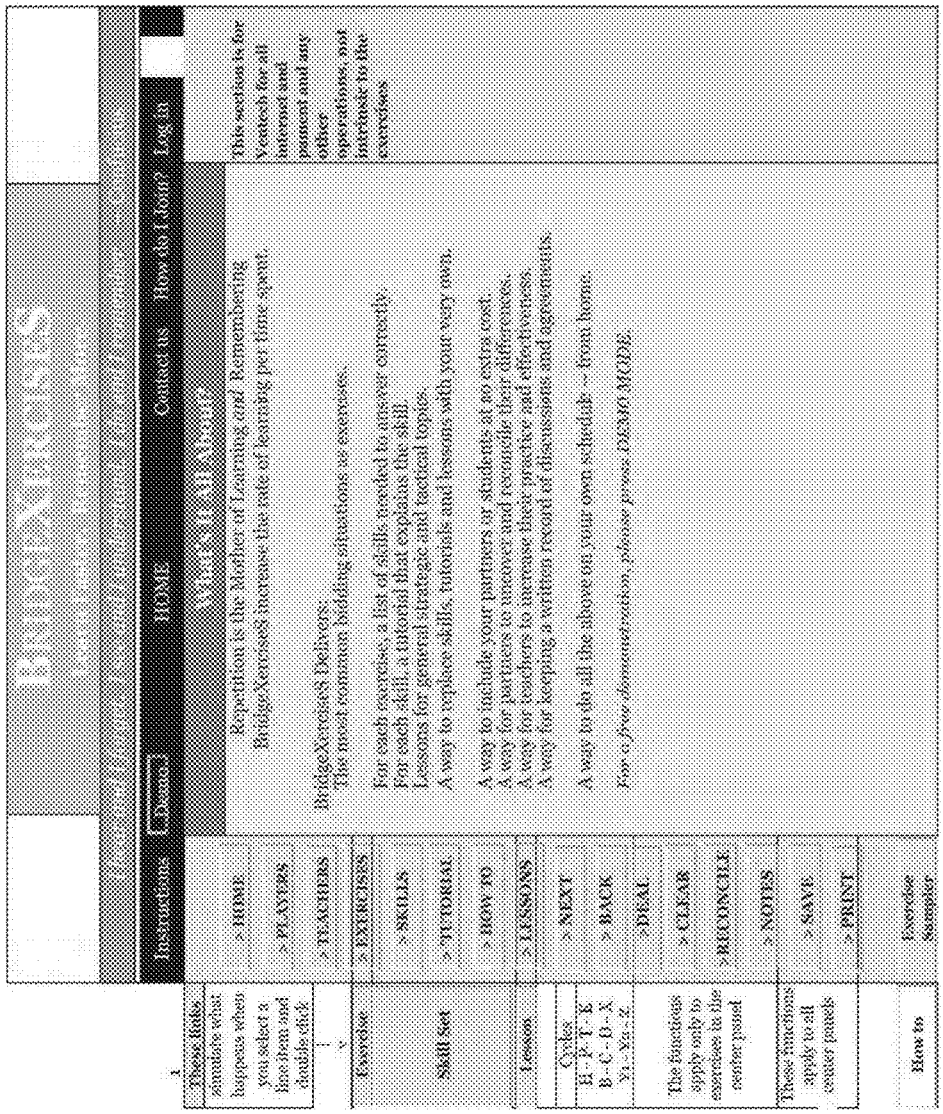
FIG. 4 presents a sample screenshot of an embodiment of the network based system for strategizing and conferencing originally introduced in FIG. 1.
Figure 5:
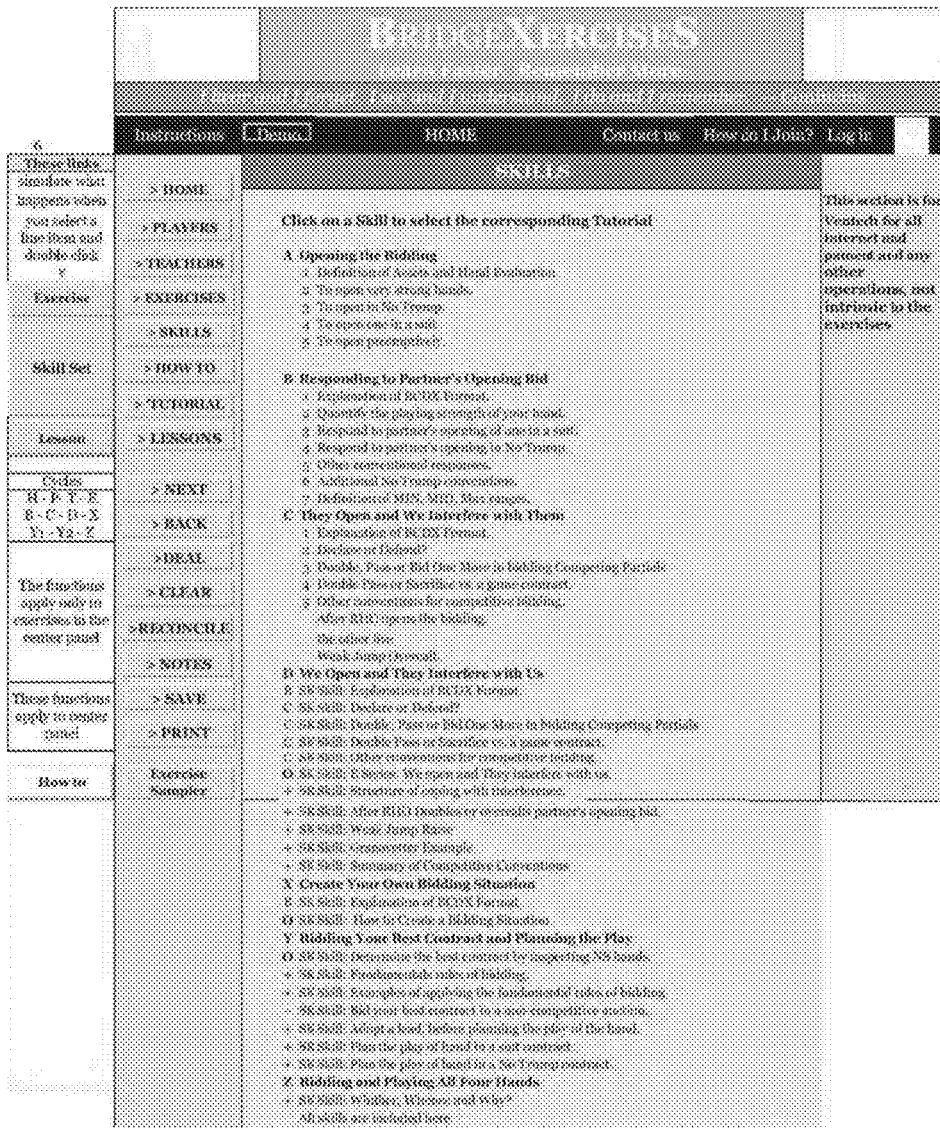
FIG. 5 presents a sample screenshot of an embodiment of the network based system for strategizing and conferencing originally introduced in FIG. 1.
Figure 6:
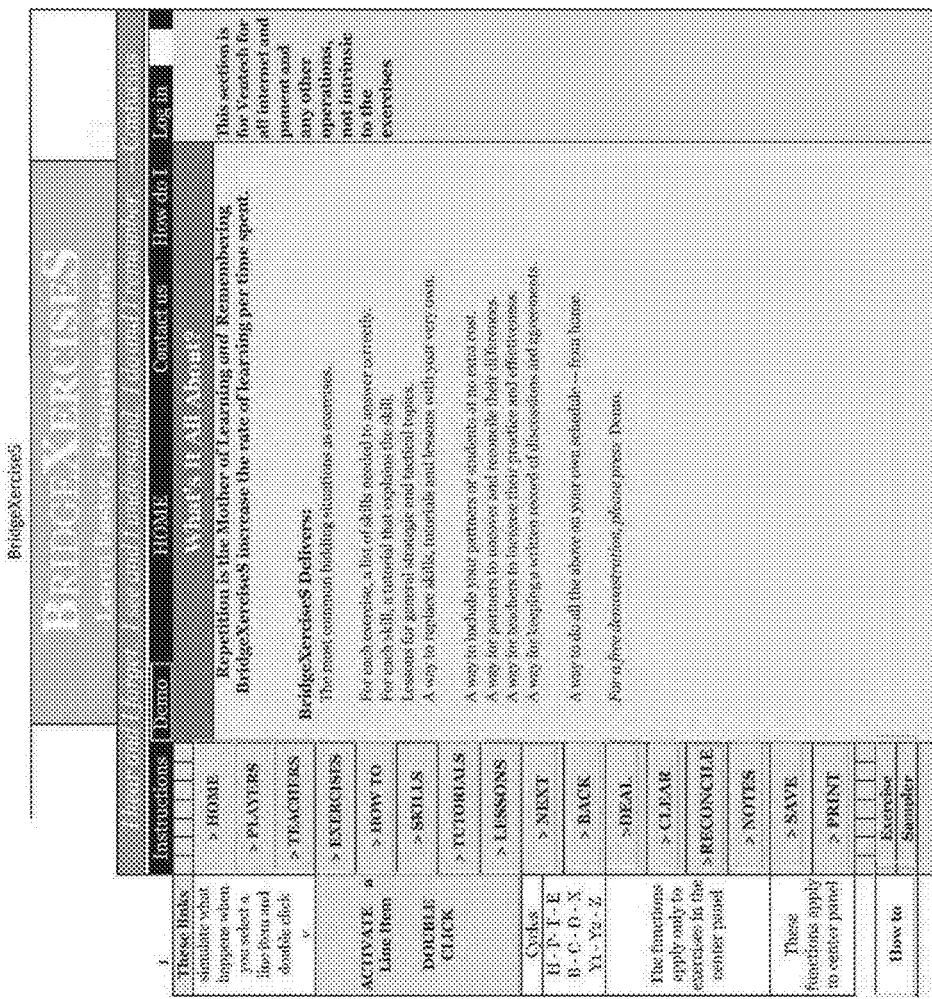
FIG. 6 presents a sample screenshot of an embodiment of the network based system for strategizing and conferencing originally introduced in FIG. 1.
Figure 9:
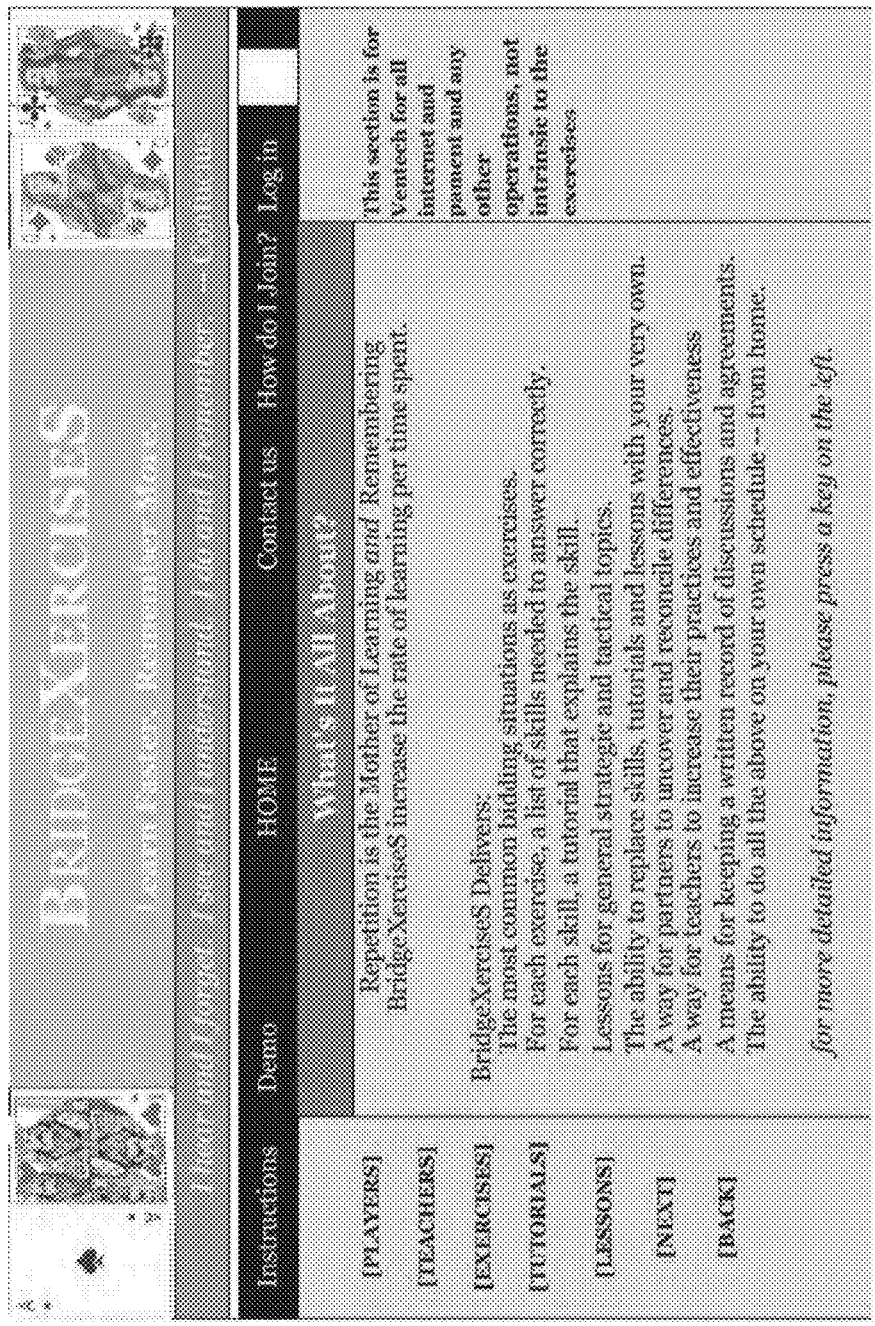
FIG. 9 presents a sample screenshot of an embodiment of the network based system for strategizing and conferencing originally introduced in FIG. 1.
Figure 10:
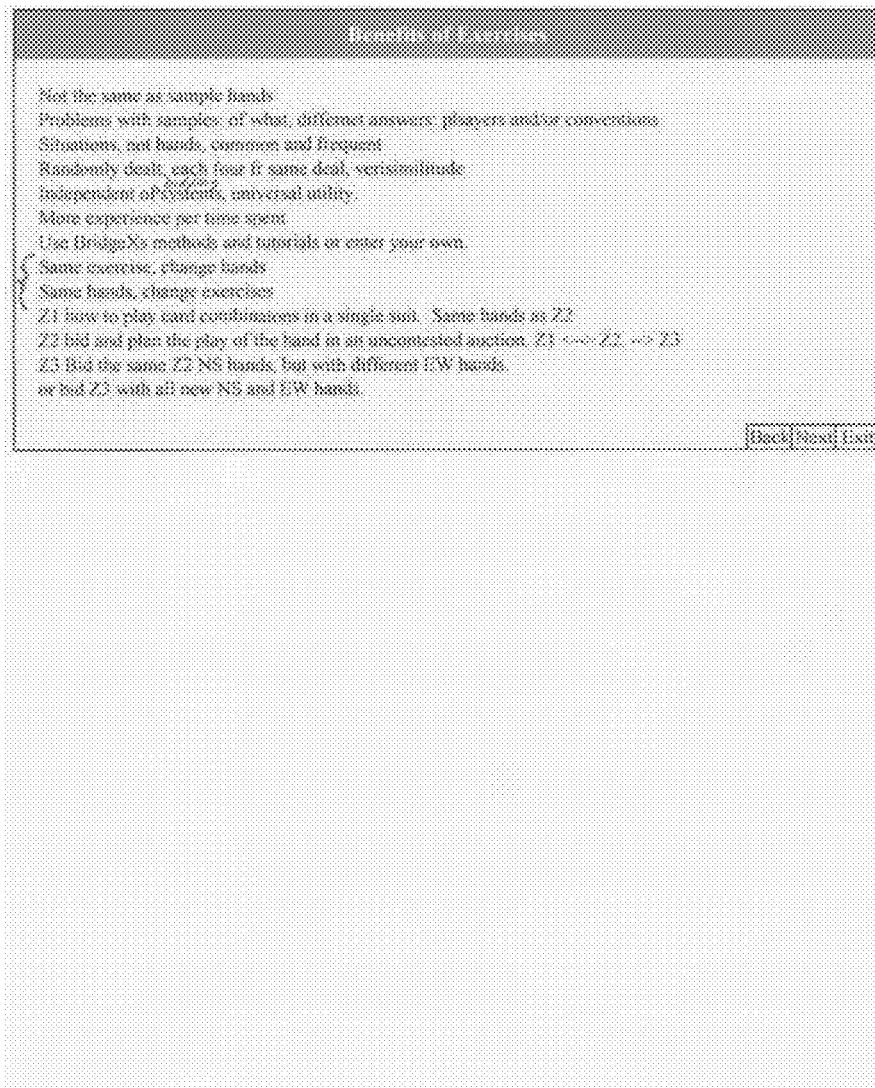
FIG. 10 presents a sample screenshot describing the benefits of the network based system for strategizing and conferencing originally introduced in FIG. 1.
Figure 13:
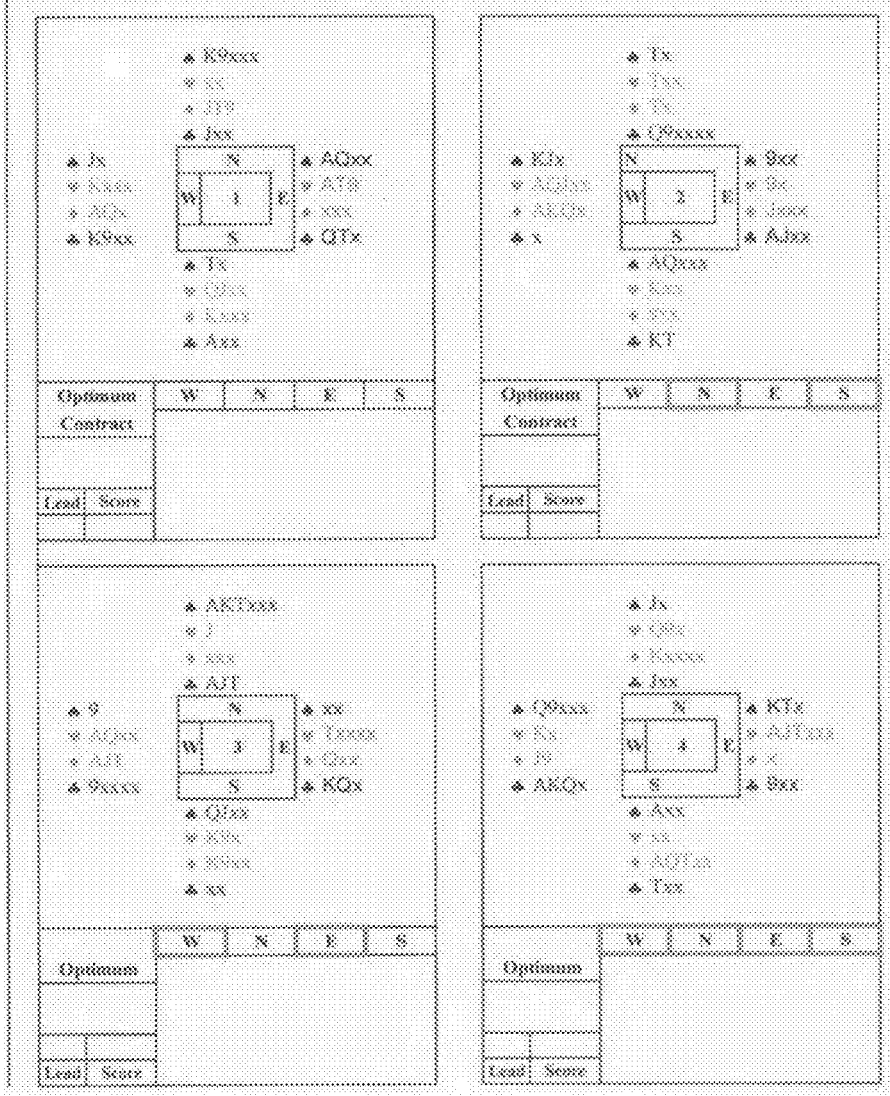
FIG. 13 presents a chart in accordance with of an embodiment of the network based system for strategizing and conferencing originally introduced in FIG. 1.
Figure 14:
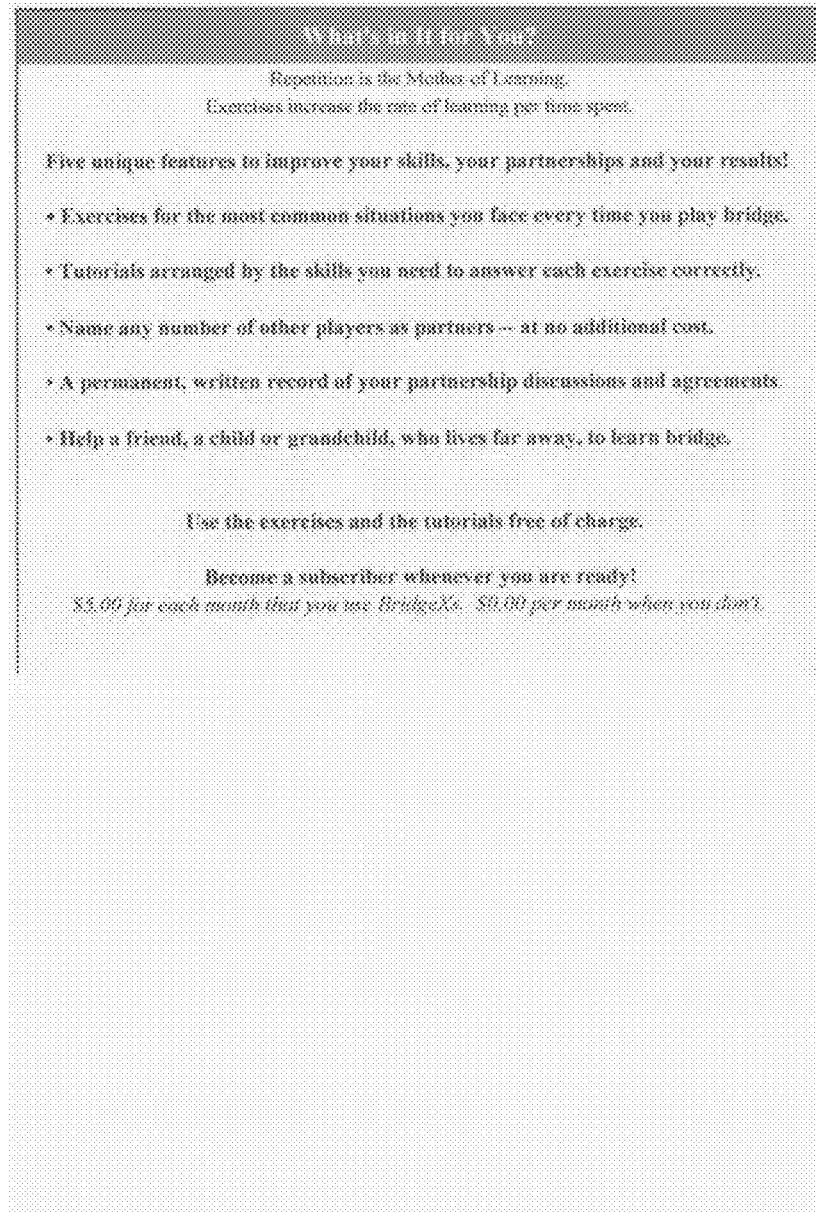
FIG. 14 presents a sample screenshot describing some unique features of an embodiment of the network based system for strategizing and conferencing originally introduced in FIG. 1.
Figure 16:
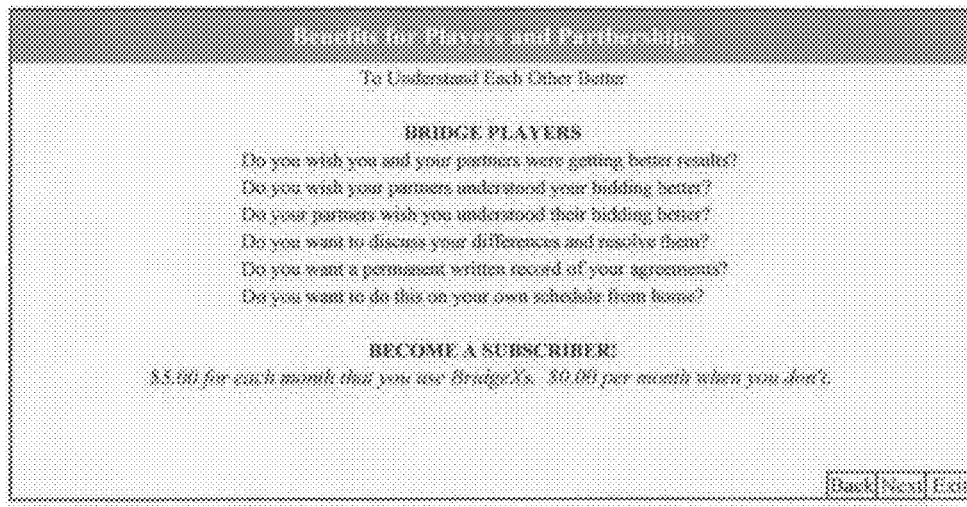
FIG. 16 presents a sample screenshot describing bridge player benefits of an embodiment of the network based system for strategizing and conferencing originally introduced in FIG. 1.
Figure 17:
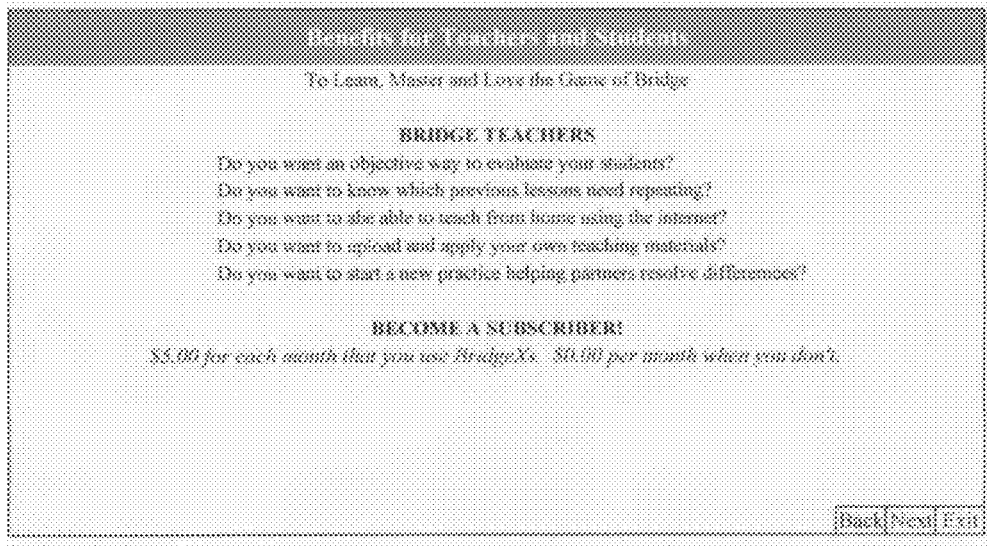
FIG. 17 presents a sample screenshot describing bridge teacher benefits of an embodiment of the network based system for strategizing and conferencing originally introduced in FIG. 1.
Figure 18:
FIG. 18 presents a sample screenshot pertaining to a Sign Up and Log In page for an Internet website, in accordance with an exemplary implementation of the invention.
Figure 19:
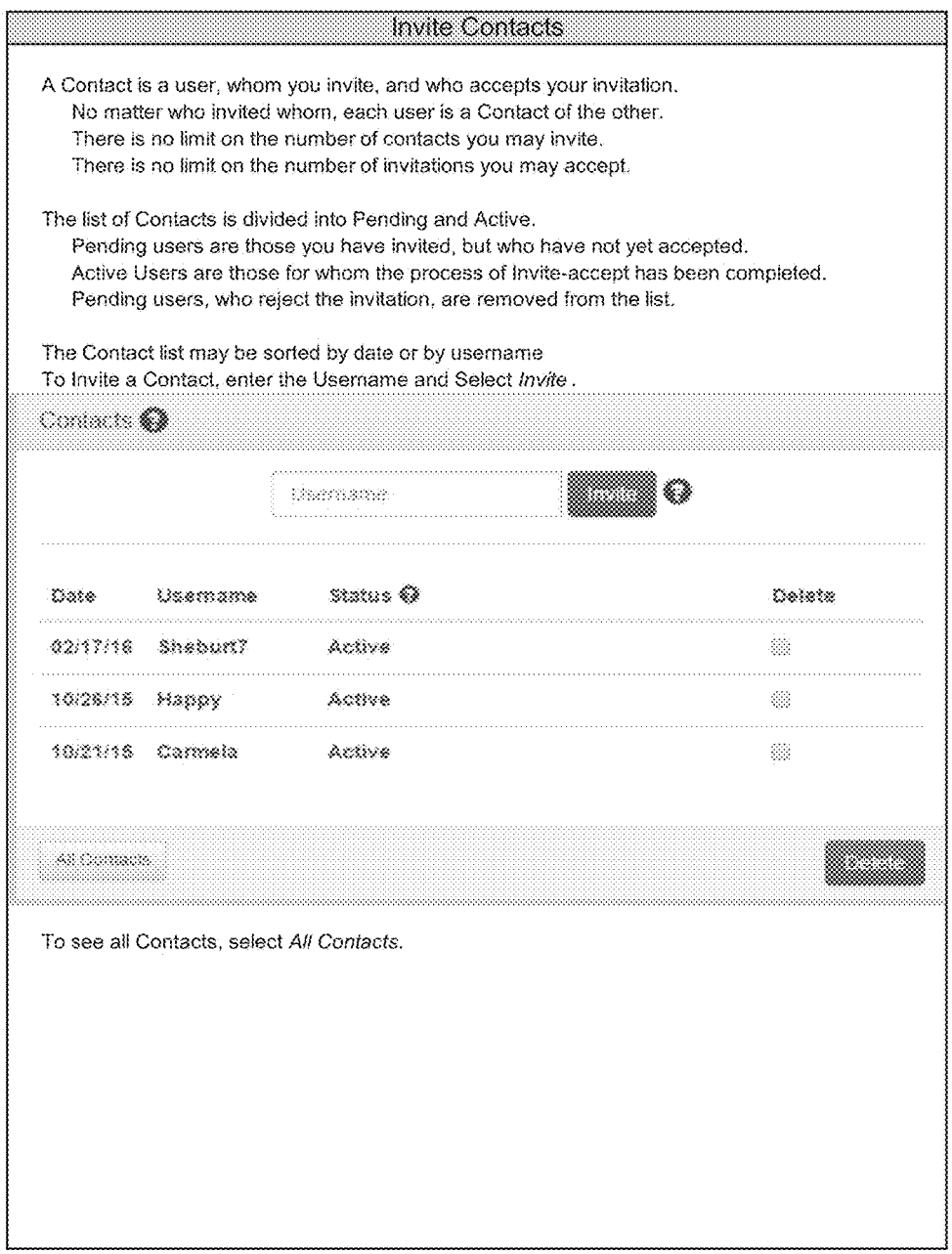
FIG. 19 presents a sample screenshot pertaining to an Invite Contacts page of an Internet website, in accordance with an exemplary implementation of the invention.
Figure 21:
FIG. 21 presents a sample screenshot pertaining to a Manage Drills page of an Internet web site, in accordance with an exemplary implementation of the invention.
Figure 24:
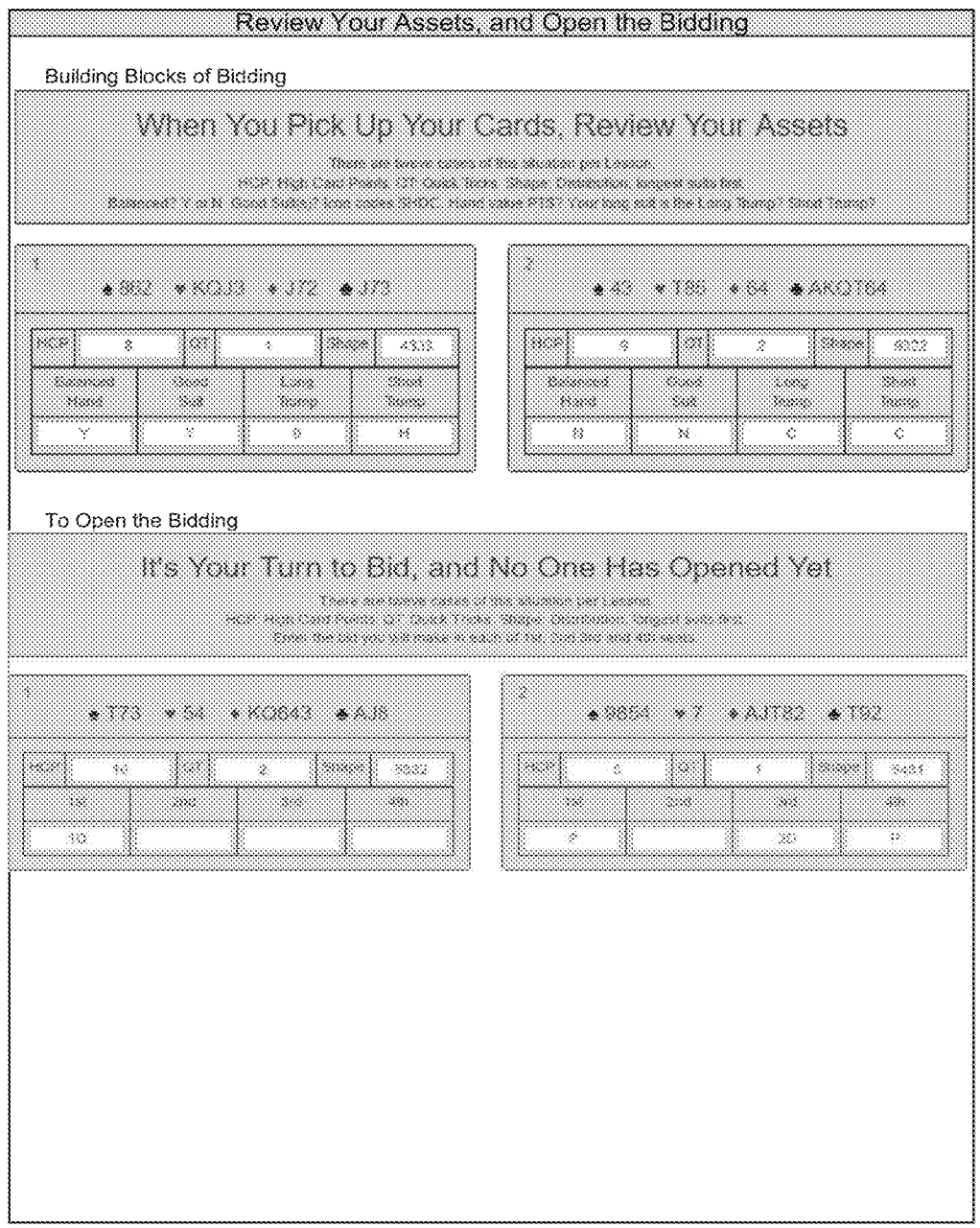
FIG. 24 presents a sample screenshot pertaining to a Review Your Assets, and Open the Bidding page of an Internet web site, in accordance with an exemplary implementation of the invention.
Figure 27:
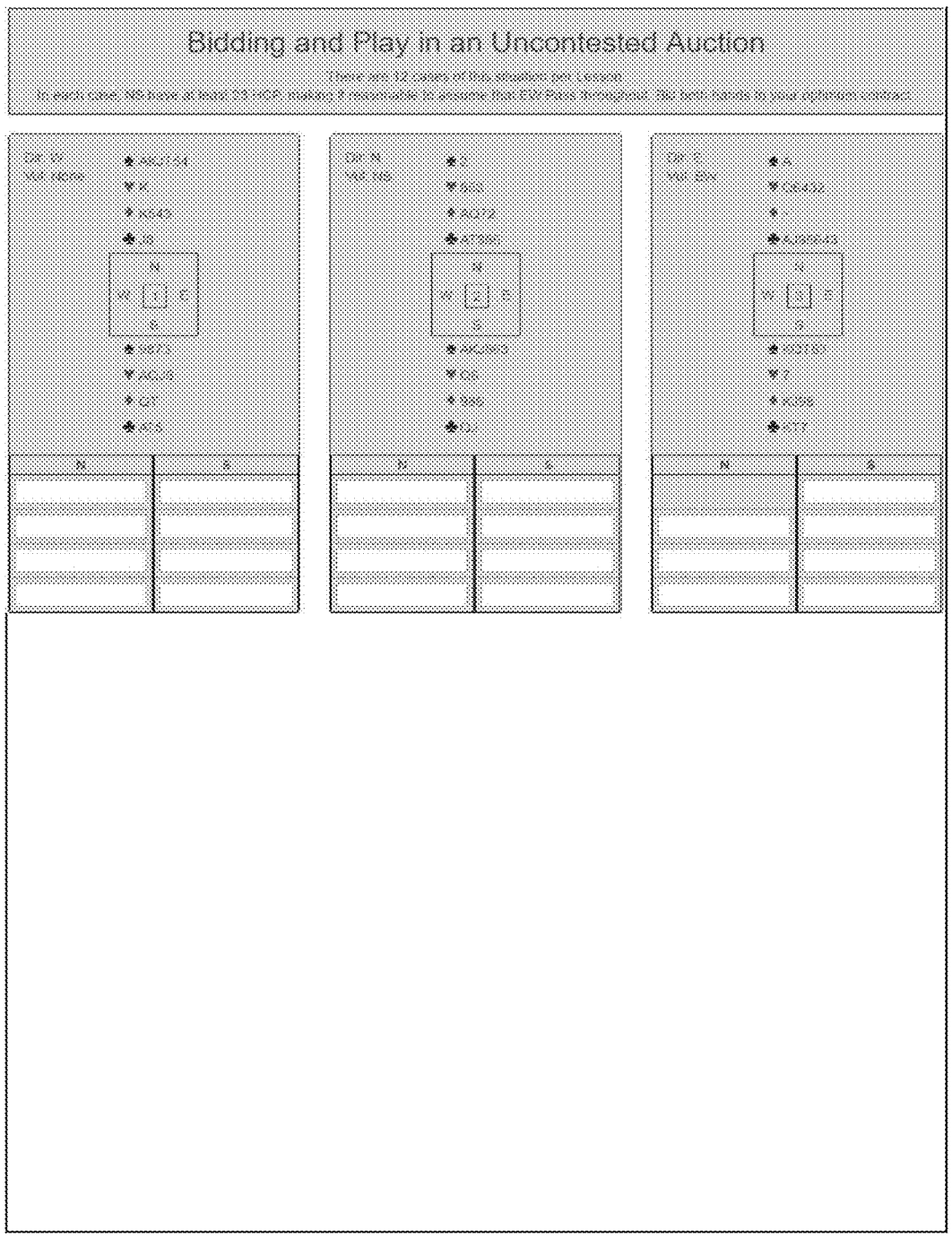
FIG. 27 presents a sample screenshot pertaining to a Bidding and Play in an Uncontested Auction page of an Internet website, in accordance with an exemplary implementation of the invention.
Figure 28:
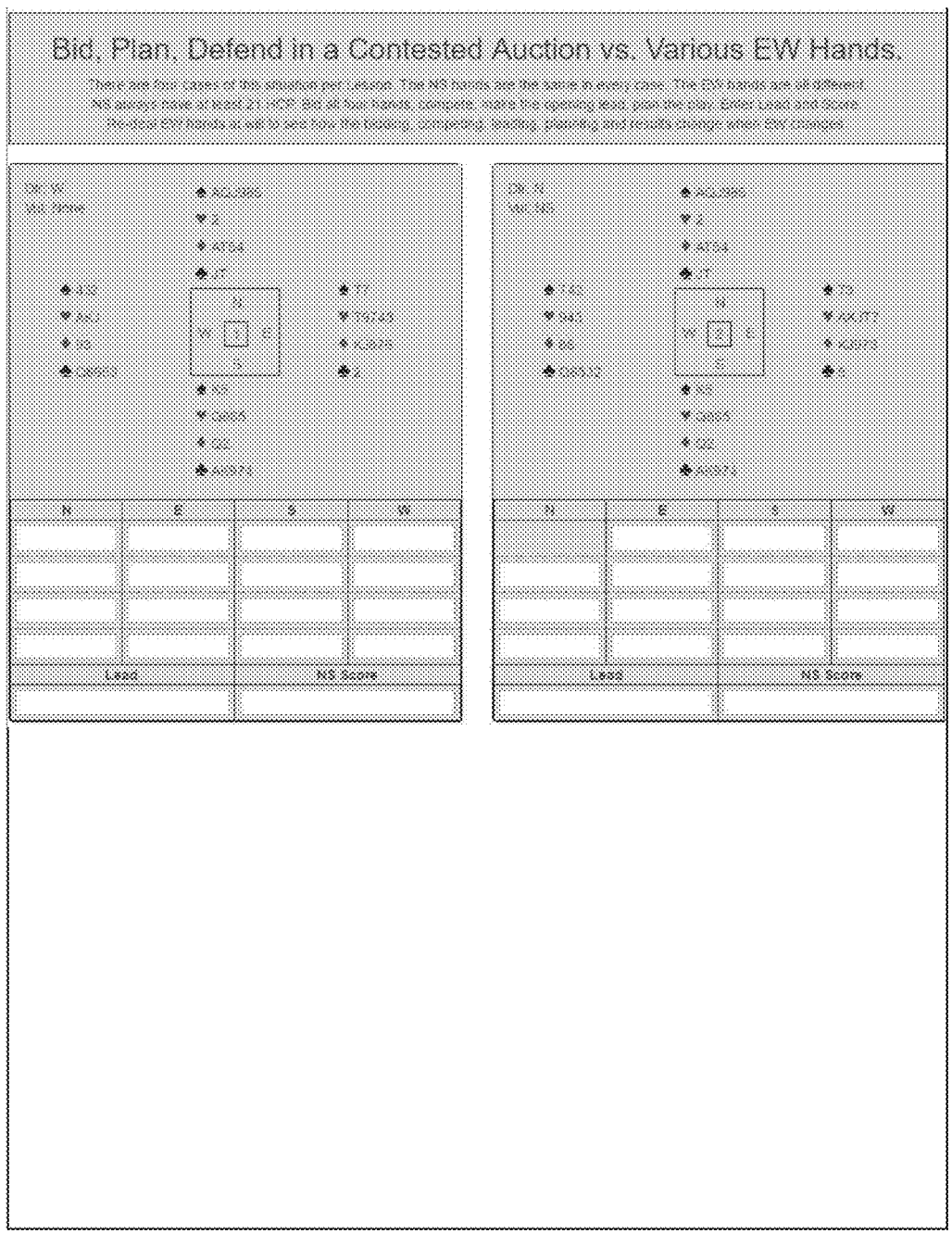
FIG. 28 presents a sample screenshot pertaining to a Bid, Plan, Defend in a Contested Auction vs. Various East-West page of an Internet website, in accordance with an exemplary implementation of the invention.

A diagrammatic flow chart of a method for creating and sharing Contract Bridge exercises between a geographically remote North player 130, 132, 134 and one or more South players 140, 142, 144 for the purpose of strategizing and/or teaching the game of Contract Bridge using the system 100 is illustrated in FIG. 2. The process commences in block 202, and a North player, such as the North player 130 utilizing a network terminal 131 accesses an Internet website in block 204. The website is facilitated by the executable instruction set for creating and strategizing Contract Bridge exercises hosted on the central computer 112. In block 206, the North player 130 is queried if he or she is a new player. If North player 130 is a new player then, in block 208, the new North player 130 is directed to create and establish a new paid account. The process of establishing a new account through an Internet website is known in the art and includes such steps as creating a user name, password, supplying user demographic information, and providing payment arrangements. Once an account has been established in block 208, the North player 130 can sign into the account in block 210. If an account already exists for the North player 130 and, in block 206, it is established that the North player 130 is not a deemed a new player, the process is directed to block 210 wherein the North player 130 signs into the existing account.

Once the North player 130 has signed into the account in block 210, the player may be queried in block 212 whether an existing exercise is desired to be selected and accessed. If not, the process is directed to block 214 where the North player 130 is able to create a new exercise and the exercise is accessed in block 216. As a paying member of the website, the North player 130 is permitted to create his or her own unique exercises and scenarios of Contract Bridge play. If the North player 130 wishes to select and access an existing exercise in block 212, the process is then directed to block 216, where the existing exercise is accessed directly. Each exercise may incorporate multiple scenarios or card draws for use in tutorials, teaching of the game, or strategizing among partners to become more familiar with a partner's theory and method of playing the game of Contract Bridge. For example, the North player 130 can generate a random deal of the cards and can then name and save this instance. The North player 130 can then, in block 220, enter bids to different spaces in the exercise form presented on the network terminal 131 as generated by the instruction set of central computer 112.

After the North player 130 has created or selected the exercise and accesses the desired exercise in block 216, the North player 130 can invite one or more South players 140, 142, 144 in block 218 to participate as potential partners in the selected exercise. The North player 130 can invite one or multiple South players 140, 142, 144 to participate in the exercise selected in blocks 212 and 214. The invitation may be distributed via email to each of the invited South players whereupon, in block 240, a South player 140, 142, 144 receives the invitation. The South player, such as the South player 140, may then access the website in block 242 whereupon the South player 140 is queried whether the player is a new player. If the South player 140 is a new player then the South player 140 can establish a free account in block 246. As a free account player, the South player 140 can participate in exercises and have their own folder, but cannot create or modify exercises. The South player 140 can be either a free account holder or a paid account (North) holder. Each player will have their own virtual folders with their created exercises and their messages with their partner players. Once the South player has established an account, either paid or free, the account is accessed in block 248.

The South player 140, in block 250, now accesses the exercise to which the North player 130 has issued the invitation in block 218. After review of the exercise scenario, the South player 140 submits a bid in block 252. Once the South player 140 has submitted a bid in block 252, for the exercise, the combined bids of the North player 130 and the South player 140 can be compared and discussed in block 254. The discussion between the North player 130 and the South player 140 in block 254 is facilitated by the executable instruction set hosted on the central computer 112. In this manner, the discussion messages can be attached to the exercise records for each of the North player 130 and the South player 140. The discussion continues until the North player 130 decides to close the message thread.

Concurrent with the exercise discussion between the North player 130 and the South player 140, the exercise will include a list of 'skills needed' and attached 'tutorials' for use by the players 130, 140 in block 256 and which are defined by the site administrator associated with the home office 110. Both skills and tutorials can be edited by the North players 140, 142, 144 for their own accounts and exercises shared with their South users. 'Skills' are a list of text items for each exercise type and 'lessons' are free tests that can be associated to specific parts of each exercise. Upon completion of the exercise and the associated message thread, the North player is queried in block 258 whether the exercise should be saved. If the North player 130 wishes to save the exercise, the exercise, in block 260, is saved and filed in the folder of the North player 130 in the memory 114 at the home office 110 and the process ends at block 262. If the North user declines in block 258 to save the exercise, the process ends at block 262.

Additionally, sample screenshots of one exemplary implementation of the system 100 are illustrated in FIGS. 3-17. The screenshots provide an example of a user interface of the system 100, including samples of website content, menus, graphics, tabs, menus, and the like.

Likewise, sample screenshots of another exemplary implementation of the system are illustrated in FIGS. 18-30, which comprise a series of webpage screenshots, incorporating both text and imagery, clearly describing and illustrating an alternate implementation of the invention incorporating additional features and concepts.

Significantly, in this alternate implementation a methodology is introduced for enabling system users to create Lesson Books. Features and applications associated with the Lesson Books are outlined and clearly presented in FIG. 20.

Significantly, in this alternate implementation a methodology is further introduced relating to the creation, management and use, of particular Drills. More detailed features and applications associated with the Drills associated with this particular implementation of the present invention are outlined and clearly presented in FIGS. 21-30.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

By way of example, the broad methodology of the present invention is highly adaptable for use in an academic setting. Teachers in classrooms all over the world routinely assign homework, drills and tests, which students return with their answers, for example, by the next class period. During the class period, the teacher comments/lectures on current readings. The students take notes, so they will be able to recall the material as needed. In due course, the teacher marks the students' results, often assigns a grade, or writes a brief note, so the student can see how she has done and what she needs to continue to work on. Using the methodology of the present invention, a teacher may create one or more pages of homework, test, drills and the like. Each page may consist of text that explains what needs to be answered, and corresponding input fields for the student's answer. The teacher enters the answers and sends these pages to the students. The teacher may also create one or more pages of commentary or lecture notes that are available to the students, for reference in answering the homework, test, drill, etc. Initially, the students are unable to view the teachers' answers. However, once the student has finished entering answers, she may select, for example, a "Match" icon to view both the teacher and student answers. Immediately upon selection of the Match icon, the student is able to view what she answered correctly and what she answered incorrectly. She may also view tabulations (but not the names/identities of other students) of how the other students have done, including how many questions were answered correctly for the entire assignment, and also tabulations per individual answer. The teacher may also view the same tabulations, for the class as a whole, per individual question, and per individual student (in this case, with each student identifiable to the teacher). In this manner, the teacher avoids the drudge work of marking and grading papers. Based upon the data, the teacher may fashion his lecture for the next class to focus on the most problematic questions/topics. Furthermore, the teacher may use the data to create student-specific lessons so that an individual student can focus on those questions/topics most problematic for her. Accordingly, implementing the present invention in this manner, the teacher is more efficient and effective teaching his students. Likewise, students are not distracted by having to take notes during the teacher's lecture and are provided with immediate feedback as far as how she is doing personally as well as in comparison to the class as a whole.

What is claimed is:

1. A computer-implemented method for improving the ability of a first partner to predict strategies and moves of a second partner during play of a future card game competition against an opposing two-partner team, the competitive card game of the type incorporating commonly-accepted partner-to-partner communication restrictions intended to avoid the first partner from divulging information pertaining to the first partner's mental game-playing strategy to the second partner, and vice-versa, where divulging such information is likely to provide an unfair advantage over the opposing team and would be considered a partner communication-related impropriety, the competitive card game of the type incorporating such a great variety of potential unique game playing situations that unique game situations are rarely duplicated, the method comprising steps of:

(a) providing a central computer system of the type having a central processing unit (CPU), memory storage device, and an instruction set executable by the CPU and presenting exemplary unique card game play situations;

(b) providing a first remote computer device controlled by said first partner and a second remote computer device controlled by said second partner, said first and second remote computer devices each in bi-directional network communication with said central computer system;

(c) identifying a unique card game playing situation by said central computer system, and communicating said unique card game playing situation to said first and second remote computer devices;

(d) prompting said first and second partners to input, via said corresponding first and second computer devices, respective proposed game moves in response to said unique card game playing situation, wherein the first and second partners subsequently input their respective proposed game moves independently for subsequent communication to said central computer system;

(e) receiving, at said central computer system, the respective proposed moves made by the first and second partners in response to the unique card game play situation;

(f) comparing, by said central computer system, the proposed moves made by the first and second partners, and determining whether or not said proposed moves are a match;

(g) communicating the proposed move made by the first partner from the central computer system to the second partner's computer device, and communicating the proposed move made by the second partner from the central computer system to the first partner's computer device, thereby enabling the first and second partners to review and compare the corresponding proposed moves;

(h) establishing, via said central computer system, bi-directional electronic communication between said first and second computer devices, and subsequently initiating an exchange of information between said first and second partners pertaining to their respective mental reasoning processes used to arrive at their respective proposed moves;

(i) arriving at a common agreed-upon proposed move based upon said unique card game play situation, where the proposed moves of the first and second partners is determined to be a non-match, and subsequently arriving at a common agreed-upon underlying mental reasoning process supporting the common agreed-upon proposed move, between said first and second partners;

(j) creating a card game situation agreement document in the form of a digital computer file, said situation agreement document functioning to record information pertaining to said unique card game play situation, to said common agreed-upon move in response to said unique card game play situation, and to said corresponding agreed-upon mental reasoning process for arriving at said common agreed-upon move;

(k) identifying and subsequently saving said situation agreement document file to a competitive card game situation agreement document file library stored upon said central computer system memory storage device in a manner enabling selective future access to said situation agreement document file in said file library by said first and second partners;

(l) inquiring, via a communication from said central system computer to said partner computer devices, whether said first and second partners both desire to create a new unique card game play situation to repeat the process; and (m) repeating steps (c) through (l) if, in step (l), said first and second partners both desire to create a new unique card game play situation, wherein, repetition of said steps (c) through (l) functions to incrementally improve each partner's comprehension and understanding of the other partner's mental thought process vis-à-vis identifiable common characteristics associated with corresponding subsets of said unique card game play scenarios, for subsequent application during an actual card game competition between said first and second partners and said opposing two-partner team.

2. A computer-implemented method as recited in claim 1, wherein the step (c) of creating a unique card game playing situation further comprises generating, at said central computer system, a random unique card game playing situation via an instruction set command communicated to said central processing unit.

3. A computer-implemented method as recited in claim 1, wherein the step (c) of creating a unique card game playing situation further comprises selecting a unique card game playing situation from a previously established library of card game playing situations maintained upon said central computer system memory storage device.

4. A computer-implemented method as recited in claim 1, wherein said competitive card game further comprises Contract Bridge and the number of potential unique game playing situations is greater than $1 \times 10^{28}$ unique game playing situations.

5. A computer-implemented method as recited in claim 4, wherein:

said step (d) of prompting the first and second partners to input, via said corresponding first and second computer devices, respective proposed game moves in response to said unique card game playing situation, further comprises prompting the first and second partners to input, via said corresponding first and second computer devices, respective proposed bids in response to a unique Contract Bridge card game playing situation; and said step (e) of receiving, at said central computer system, the respective proposed moves made by made by the first and second partners in response to the unique card game play situation, further comprises receiving; at said central computer system; the respective proposed bids made by the first and second partners in response to a unique Contract Bridge card game playing situation.

* * * * *